US010071927B2

(12) United States Patent
Butters et al.

(10) Patent No.: US 10,071,927 B2
(45) Date of Patent: Sep. 11, 2018

(54) APPARATUS, SYSTEMS, AND METHODS FOR FLUID FILTRATION

(71) Applicants: Brian E. Butters, London (CA); Anthony L. Powell, London (CA); John D. Pearce, London (CA)

(72) Inventors: Brian E. Butters, London (CA); Anthony L. Powell, London (CA); John D. Pearce, London (CA)

(73) Assignee: 1934612 Ontario Inc., London, Ontario (CA)

( * ) Notice: Subject to any disclaimer, the term of this patent is extended or adjusted under 35 U.S.C. 154(b) by 669 days.

(21) Appl. No.: 13/915,506

(22) Filed: Jun. 11, 2013

(65) Prior Publication Data
US 2013/0341270 A1    Dec. 26, 2013

Related U.S. Application Data

(60) Provisional application No. 61/658,186, filed on Jun. 11, 2012, provisional application No. 61/679,410, filed on Aug. 3, 2012.

(51) Int. Cl.
*B01D 65/08* (2006.01)
*B01D 61/16* (2006.01)
(Continued)

(52) U.S. Cl.
CPC .............. *C02F 9/00* (2013.01); *B01D 61/145* (2013.01); *B01D 61/147* (2013.01); *B01D 61/16* (2013.01); *B01D 63/066* (2013.01); *B01D 65/08* (2013.01); *B01D 2311/04* (2013.01); *B01D 2311/18* (2013.01); *B01D 2311/2626* (2013.01);
(Continued)

(58) Field of Classification Search
None
See application file for complete search history.

(56) References Cited

U.S. PATENT DOCUMENTS 5,462,674 A * 10/1995 Butters .................. C02F 1/325
210/321.69
5,501,798 A *  3/1996 Al-Samadi ............. B01D 61/04
210/638
(Continued)

FOREIGN PATENT DOCUMENTS

EP         1903008 A1     3/2008
JP         08512245 A    12/1996
(Continued)

OTHER PUBLICATIONS

Luder, J. chem. Educ. 19, pp. 24-26, 1942, 3 total pages.*
(Continued)

*Primary Examiner* — Dirk Bass
*Assistant Examiner* — Jonathan Peo
(74) *Attorney, Agent, or Firm* — Baker & McKenzie LLP

(57) ABSTRACT

The present disclosure relates, according to some embodiments, to apparatus, systems, and methods for reduction and/or removal of one or more contaminants (e.g., heavy metals, chromium, phosphorous, phosphorous compounds, nitrogen, nitrogen compounds) from a feed composition (e.g., a fluid). Apparatus, systems, and methods, in some embodiments, may be operable to decontaminate a fluid with comparatively little or no contaminant containing waste fluid.

56 Claims, 9 Drawing Sheets

(51) Int. Cl.
| | |
|---|---|
| *C02F 9/00* | (2006.01) |
| *B01D 63/06* | (2006.01) |
| *B01D 61/14* | (2006.01) |
| *C02F 1/28* | (2006.01) |
| *C02F 1/32* | (2006.01) |
| *C02F 1/44* | (2006.01) |
| *C02F 1/66* | (2006.01) |
| *C02F 1/70* | (2006.01) |
| *C02F 1/72* | (2006.01) |
| *C02F 101/20* | (2006.01) |
| *C02F 101/22* | (2006.01) |

(52) U.S. Cl.
CPC ............. *B01D 2311/2634* (2013.01); *B01D 2311/2638* (2013.01); *B01D 2321/04* (2013.01); *B01D 2321/2066* (2013.01); *C02F 1/281* (2013.01); *C02F 1/32* (2013.01); *C02F 1/444* (2013.01); *C02F 1/66* (2013.01); *C02F 1/70* (2013.01); *C02F 1/725* (2013.01); *C02F 2101/20* (2013.01); *C02F 2101/22* (2013.01)

(56) References Cited

U.S. PATENT DOCUMENTS

| | | | |
|---|---|---|---|
| 5,554,300 A | 9/1996 | Butters et al. | |
| 2007/0102347 A1* | 5/2007 | Matsushiro | B01D 61/142 210/490 |
| 2009/0223894 A1* | 9/2009 | Muramoto | B01D 61/025 210/636 |
| 2013/0032543 A1 | 2/2013 | Butters et al. | |

FOREIGN PATENT DOCUMENTS

| | | |
|---|---|---|
| JP | 2005246156 A | 9/2005 |
| JP | 2006192378 A | 7/2006 |
| JP | 2007021347 A | 2/2007 |
| JP | 2008528269 A | 7/2008 |
| WO | 92/11915 A1 | 7/1992 |
| WO | 9523766 A1 | 9/1995 |
| WO | 2012/137069 A2 | 4/2012 |

OTHER PUBLICATIONS

USP technologies, "What is the pH of H2O2 solutions", Obtained from Web, Apr. 11, 2017, <http://www.h2o2.com/faqs/FaqDetail.aspx?fld=26>.*
Extended European Search Report, EP Application No. 13804028.2, dated Oct. 27, 2015, 9 pages.
Doll et al., "Cross-flow microfiltration with periodical backwashing for photocatalytic degradation of pharmaceutical and diagnostic residues—evaluation of the long-term stability of the photocatalytic activity of TiO2", Water Research, Elsevier, Amsterdam, NL, vol. 39, No. 5, Mar. 1, 2005 (Mar. 1, 2005), pp. 847-854, XP027613919, ISSN: 0043-1354.
Written Opinion of the International Searching Authority, PCT/IB2013/001875, dated Feb. 5, 2014, 5 pages.
International Preliminary Report on Patentability, PCT/IB2013/001875, dated Dec. 16, 2014, 6 pages.
International Search Report, PCT/IB2013/001875, dated Feb. 5, 2014, 5 pages.
Japanese Office Action dated Apr. 18, 2017 in connection with Japanese Application No. 2015-516702, 6 pages.
Australian Examinaton Report No. 1 in connection with Australian Application No. 2013276218, 4 pages.
Colombian Office Action dated Mar. 8, 2017 in connection with Colombian Application No. 15004569, 57 pages.
Examination Report dated Feb. 16, 2018 in connection with European Application No. 13804028.2, 9 pages.

* cited by examiner

APPARATUS, SYSTEMS, AND METHODS FOR FLUID FILTRATION

CROSS-REFERENCE TO RELATED APPLICATIONS

This application claims priority to U.S. Provisional Application No. 61/658,186, filed Jun. 11, 2012 and U.S. Provisional Application No. 61/679,410, filed Aug. 3, 2012. The contents of all of the above are hereby incorporated in their entirety by reference.

FIELD OF THE DISCLOSURE

The present disclosure relates, in some embodiments, to filtration apparatus, systems, and methods that reduce membrane fouling. The present disclosure further relates, in some embodiments, to apparatus, systems, and methods for reduction and/or removal of one or more contaminants (e.g., heavy metals, chromium, phosphorous, phosphorous compounds, nitrogen, nitrogen compounds) from a feed composition (e.g., a fluid).

BACKGROUND OF THE DISCLOSURE

Since almost all forms of life need water to survive, the improvement of water quality in decontamination systems has typically been a subject of significant interest. As a result, treatment systems and techniques for removing contaminants from contaminated fluids have been developed in the past. Prior approaches have included water treatment by applying various microorganisms, enzymes and nutrients for the microorganisms in water. Other approaches involve placing chemicals, such as chlorine, in the contaminated fluids in an effort to decontaminate supplies. Some such systems have proved to be somewhat successful; however, severe deficiencies in each approach may still be prominent. In some prior systems, solid reactants are used that have to be dissolved or dispersed prior to use, or were cumbersome and not particularly suited for prolonged water treatment, or could not be used in a wide variety of different types of applications. In particular, the handling of the solid reactants often posed problems with respect to different dissolution rates, concentrations and growth rates. In addition, in systems employing chemical additives, the resulting "decontaminated" fluid may actually now be contaminated by these chemicals, in spite of having removed the original biological or other contaminants from the media. Even in systems employing micro filtration, problems with the system may not be from any sort of additive, but instead may simply be the clogging of the filter elements or membranes with foulants accumulated from the decontamination process. Time-consuming filter cleaning processes combined with system downtime can become costly and inefficient for purification companies.

One approach to treating surface waters and other contaminated fluids is to coagulate water-borne contaminants with suitable coagulants such as ferric chloride, poly-aluminum chloride, alum, or other coagulants known in the art. Chemical coagulants change the surface charge of contaminants, which reduces the repelling force between the contaminants. As such, the coagulants allow the contaminants to collide and coagulate together into larger flocs. Larger particles can still be formed by adding suitable polymers into the contaminated fluid. The polymers form bridges between the flocs to form large agglomerates. The large agglomerates settle with gravity and may be removed by a clarifier or a filter.

Some treatment processes may include modifying the pH of the contaminated fluid prior to adding the coagulants because some coagulants operate best within a specific pH range. For example, some ferric-based coagulants may operate best at reduced pH levels, which may require adding acids to the contaminated fluid. Other coagulants may operate best at specific alkalinities, which may require adding bicarbonate or acids depending on whether the alkalinity is too low or high. In some cases, the addition of the coagulant itself may affect the pH, and neutralization may be required.

Another approach to treating contaminated fluid uses ion exchange to exchange benign molecules with contaminants of concern. An example is the removal of hexavalent chromium. Once the exchange sites of the ion exchange media is spent, the regeneration of the exchange media creates a large volume of brine containing the contaminants of concern.

As used herein, "contaminated fluid" is a fluid that contains undesirable organic, inorganic products, metals, and possibly microbial cells or other microorganisms. Although contaminants are undesirable in the sense that they are usually toxic when ingested or contacted by humans, the term "undesirable" should not be understood to be restricted to such toxic substances.

SUMMARY

Accordingly, a need has arisen for improved apparatus, systems, and methods for reduction and/or removal of one or more undesirable materials from a feed composition.

The present disclosure relates, according to some embodiments, to apparatus, systems, and methods for removing foulants in a filtration membrane. A filtration membrane may comprise a porous substrate having a plurality of longitudinal channels defined therein. Membrane films may be disposed on the surface of the channels. Contaminated media may be fed into the filtration membrane at a first end, and the membrane films may be operable to separate contaminated media into a permeate fluid that was able to pass through the membrane film and a retentate fluid that exits at a second end of the filtration membrane. The permeate fluid may pass through the pores of the substrate and exit the filtration membrane through at least one outlet. Both the permeate and retentate fluids may undergo further treatment such as additional filtration and decantation.

The present disclosure relates, according to some embodiments, to apparatus, systems, and methods for oxidation, reduction and/or removal of one or more contaminants (e.g., heavy metals, chromium, phosphorous, phosphorous compounds, nitrogen, nitrogen compounds) from a feed composition (e.g., an intake fluid). For example, in some embodiments, a decontamination system for removing a contaminant from an intake fluid may comprise (a) a fluid reactor (e.g., a reduction reactor, an oxidation reactor, or mixing reactor), (b) a catalyst recovery unit (CRU) in fluid communication with the fluid reactor, (c) a contaminant-concentrating module (DeWRS) in fluid communication with the a catalyst recovery unit, (d) a first storage tank containing an acidic composition or a basic composition and arranged in fluid communication with the contaminant-concentrating module, (e) a contaminant-concentrating mixer tank (DeWMT) in fluid communication with the first storage tank, (f) a clean adsorbent storage tank in fluid communication with a desorbed adsorbent stream and the intake stream, (g) a second tank containing (i) an acidic composition if the first storage tank contains a basic composition or (ii) a basic composition if the first storage tank contains an acidic composition, and/or (h) a rinse tank in fluid communication with a desorbed contaminant stream and the second storage tank.

A fluid reactor, in some embodiments, may be configured (i) to receive the intake fluid, (ii) optionally, to reduce or oxidize at least a portion of the contaminant to form a reduced contaminant or an oxidized contaminant, (iii) to permit the contaminant (e.g., the (unchanged) contaminant, the reduced contaminant, or the oxidized contaminant) to bind an adsorbent to form a contaminant-adsorbent material, and/or (iv) to form a fluid reactor output stream comprising the contaminant-adsorbent material. In some embodiments, a fluid reactor may comprise a photocatalytic reactor operable to photo reduce a contaminant. An intake fluid may comprise one or more contaminants. For example, an intake fluid may comprise chromium (e.g., hexavalent chromium, trivalent chromium). A reduced contaminant may comprise trivalent chromium in some embodiments.

A system may include, in some embodiments, an acid tank in fluid communication with the intake stream and operable to regulate the pH of the intake stream and/or the contents of the fluid reactor. An acid tank, in some embodiments, may contain an acidic composition. An acid composition may have a low pH (e.g., below ~7, below ~6, below ~5, below ~4, below ~3, below ~2, and/or below ~1). An acid may be a strong acid, a weak acid, a mineral acid, an organic acid, or any other suitable acid. An acid composition may comprise, for example, citric acid. Without limiting the disclosure to any particular mechanism of action, acidifying the contents of a photocatalytic reduction may favor contaminant reduction (e.g., instead of oxidation).

According to some embodiments, a catalyst recovery unit (CRU) may comprise (i) a CRU porous membrane defining a CRU retentate portion and a CRU permeate portion of the catalyst recovery unit. A catalyst recovery unit, in some embodiments, may be (ii) configured to receive the fluid reactor output stream in the CRU retentate portion of the CRU porous membrane and fractionate the fluid reactor output stream into (A) a CRU retentate comprising the contaminant-adsorbent material in the CRU retentate portion of the catalyst recovery unit and/or (B) a CRU permeate substantially free of the contaminant in the CRU permeate portion of the catalyst recovery unit. The CRU retentate portion may be in fluid communication with the intake stream and the CRU filtrate forms a first discharge stream.

A CRU porous membrane may comprise, for example, a ceramic membrane. A catalyst recovery unit and its CRU porous membrane may be configured such that the membrane operates as a crossflow membrane. In some embodiments, the concentration of the contaminant-adsorbent material in the CRU retentate is from about 10 times to about 20 times higher than the concentration of the contaminant-adsorbent material in the fluid reactor output stream.

A contaminant-concentrating module (DeWRS) may (i) be in fluid communication with the CRU retentate portion of the catalyst recovery unit and/or (ii) comprise a DeWRS porous membrane, oriented in a vertical position, defining a DeWRS retentate portion and a DeWRS permeate portion of the contaminant-concentrating module, according to some embodiments. A contaminant-concentrating module (DeWRS) may be configured, in some embodiments, (iii) to receive at least a portion of the CRU retentate in the DeWRS retentate portion of the contaminant-concentrating module and fractionate the CRU retentate into (A) a DeWRS retentate comprising the contaminant-adsorbent material in the DeWRS retentate portion of the contaminant-concentrating module and/or (B) a DeWRS permeate substantially free of the contaminant in the DeWRS permeate portion of the contaminant-concentrating module, wherein the DeWRS filtrate forms a second discharge stream. According to some embodiments, a contaminant-concentrating module (DeWRS) may be configured to permit the contaminant-adsorbent material in the DeWRS retentate to (A) settle into a contaminant trap positioned below the DeWRS porous membrane and/or (B) form a contaminant trap slug.

A DeWRS porous membrane may comprise, for example, a ceramic membrane. A contaminant-concentrating module (DeWRS) and its DeWRS porous membrane may be configured such that the membrane operates as a dead-end membrane. In some embodiments, the concentration of the contaminant-adsorbent material in the contaminant trap slug is from about 10 times to about 20 times higher than the concentration of the contaminant-adsorbent material in the CRU retentate. A contaminant-concentrating module, in some embodiments, may be configured to pulse the DeWRS porous membrane with a dynamic shock (e.g., to defoul the membrane).

In some embodiments, a membrane may include a porous substrate having a plurality of longitudinal channels defined therein. A membrane film may be disposed on the surface of longitudinal channels. A dynamic shock may comprise a pulse of fluid that introduces an amount of energy that is sufficiently high and in such a short duration so as to create cavitation in the fluid proximate to the substrate and membrane films. Cavitation of the dynamic shock, in some embodiments, may be operable to form and substantially immediately implode cavities in the fluid located throughout the membrane, thereby rupturing biological matters and releasing organic and inorganic matter from the substrate and membrane films. An exemplary approach for creating cavitation is to subject the fluid in the membrane to rapid changes of pressure to cause the formation of cavities where the pressure is relatively low.

According to some embodiments, a first storage tank (e.g., an acid storage tank) may contain an acidic composition. An acidic composition may have a low pH (e.g., below ~7, below ~6, below ~5, below ~4, below ~3, below ~2, and/or below ~1). An acid may be a strong acid, a weak acid, a mineral acid, an organic acid, or any other acid that tends to favor dissociation of the contaminant and the adsorbent. Selection of an acid may consider the quantity and/or nature of the contaminant(s) in the intake fluid and/or the adsorbent added. In some embodiments, an acidic composition may comprise sulfuric acid. An acid storage tank may be in fluid communication with a make-up tank containing a volume of a make-up acid composition, which may be conveyed to the acid storage tank as needed and/or desired.

According to some embodiments, a first storage tank (e.g., a base storage tank) may contain a basic composition. A basic composition may have a high pH (e.g., above ~7, above ~8, above ~9, above ~10, above ~11, above ~12, and/or above ~14). A base may be a strong base, a weak base, a mineral base, an organic base, or any other acid that tends to favor dissociation of the contaminant and the adsorbent. Selection of a base may consider the quantity and/or nature of the contaminant(s) in the intake fluid and/or the adsorbent added. In some embodiments, a basic composition may comprise sodium hydroxide. A base storage tank may be in fluid communication with a make-up tank containing a volume of a make-up base composition, which may be conveyed to the base storage tank as needed and/or desired.

A contaminant-concentrating mixer tank (DeWMT), in some embodiments, may be (i) in fluid communication with the DeWRS retentate portion of the contaminant-concentrating module and in fluid communication with the acid storage tank and/or (ii) may comprise a DeWMT porous membrane defining a DeWMT retentate portion and a DeWMT permeate portion of the contaminant-concentrating mixer tank.

According to some embodiments, a contaminant-concentrating mixer tank may be (iii) configured to receive at least a portion of the DeWRS retentate in the DeWMT retentate portion of the contaminant-concentrating mixer tank and fractionate the received DeWRS retentate into (A) a DeWMT retentate comprising the contaminant-adsorbent material in the DeWMT retentate portion of the contaminant-concentrating mixer tank and/or (B) a DeWMT permeate substantially free of the contaminant in the DeWMT permeate portion of the contaminant-concentrating mixer tank, wherein the DeWMT filtrate forms a third discharge stream. A contaminant-concentrating mixer tank may be configured, in some embodiments, to receive from the acid storage tank into the DeWMT retentate portion of the contaminant-concentrating mixer tank an amount of the acid composition, mix the contents of the DeWMT retentate portion of the contaminant-concentrating mixer tank to permit desorption of the contaminant from the adsorbent to form a desorbed contaminant stream, a desorbed adsorbent stream, and, optionally, a residual contaminant-adsorbent material, and/or convey the optional residual contaminant-adsorbent material, if present, to the acid storage tank.

A contaminant-concentrating mixer tank may be configured to receive the at least a portion of the DeWRS retentate in the DeWMT retentate portion of the contaminant-concentrating mixer tank under pressure, in some embodiments. A contaminant-concentrating mixer tank may be configured, according to some embodiments, to mix the contents of the DeWMT retentate portion of the contaminant-concentrating mixer tank to form a DeWMT mixture by bubbling a gas through the contents of the DeWMT retentate portion of the contaminant-concentrating mixer tank. A contaminant-concentrating mixer tank may be configured to receive an acid composition at a temperature of about 40° C. to about 60° C., at a concentration of up to about 5 wt. %, and/or at a pH of less than about 1.

A decontamination system may comprise, in some embodiments, a clean adsorbent storage tank in fluid communication with the desorbed adsorbent stream and the intake stream. A clean adsorbent storage tank may be configured to supply adsorbent (e.g., in a solvent mixture) to an intake stream and/or a fluid reactor. The amount supplied may be regulated, for example, according to the volume of intake fluid, the anticipated or measured amount of contaminant in the intake fluid, the nature of the contaminant(s) in the intake fluid, any other necessary or desired parameter, or combinations thereof. If desired, a system may be configured to recycle adsorbent. For example, a clean adsorbent storage tank may receive desorbed adsorbent from, for example, a contaminant-concentrating mixer tank. According to some embodiments, an adsorbent may comprise titanium (e.g., titanium oxide).

In some embodiments, a decontamination system may include a second storage tank (e.g., an acid tank) containing an acidic composition, for example, where the first storage tank contains a basic composition. An acidic composition may have a low pH (e.g., below ~7, below ~6, below ~5, below ~4, below ~3, below ~2, and/or below ~1). An acid may be a strong acid, a weak acid, a mineral acid, an organic acid, or any other acid that tends to favor formation of a contaminant solid (e.g., precipitate). Selection of an acid may consider the quantity and/or nature of the contaminant(s) in the intake fluid and/or the adsorbent added. In some embodiments, an acidic composition may comprise sulfuric acid.

In some embodiments, a decontamination system may include a second storage tank (e.g., a base tank) containing a basic composition, for example, where the first storage tank contains an acidic composition. A basic composition may have a high pH (e.g., above ~7, above ~8, above ~9, above ~10, above ~11, above ~12, and/or above ~14). A base may be a strong base, a weak base, a mineral base, an organic base, or any other base that, that tends to favor formation of a contaminant solid (e.g., precipitate). Selection of a base may consider the quantity and/or nature of the contaminant(s) in the intake fluid and/or the adsorbent added. In some embodiments, a base may comprise sodium hydroxide.

According to some embodiments, a rinse tank may be in fluid communication with the desorbed contaminant stream, in fluid communication with the base tank, and/or configured to receive and mix the received desorbed contaminant stream with the received base to permit formation of a contaminant precipitate and a rinse tank supernatant, wherein the rinse tank supernatant forms a fourth discharge stream.

A system may be configured and/or operated to regulate the amount of contaminant present in each discharge stream. In some embodiments, it may be desired to configure and/or operate a decontamination system to delivery one or more discharge streams with residual contaminant concentrations that are as low as possible, as low as practicable, and/or below a desired or required threshold. In some embodiments, a first discharge stream, a second discharge stream, a third discharge stream, and a fourth discharge stream may comprise (each independently or collectively) less than about 20 ppb of a contaminant (e.g., chromium). A first discharge stream, a second discharge stream, a third discharge stream, and a fourth discharge stream, according to some embodiments, may comprise (each independently or collectively) less than about 1 ppb of a reduced contaminant (e.g., trivalent chromium). All or a portion of each discharge stream independently may be discharged out of the system and/or recycled back into the system as desired and/or required. A first discharge stream, a second discharge stream, a third discharge stream, and a fourth discharge stream, according to some embodiments, may be combined into a composite discharge stream.

The present disclosure relates, according to some embodiments, to methods for reduction and/or removal of one or more heavy metals (e.g., heavy metals, chromium, phosphorous, phosphorous compounds, nitrogen, nitrogen compounds) from a feed composition (e.g., an intake fluid). For example, in some embodiments, a method may separate an intake fluid comprising a contaminant into (A) a contaminant solid fraction and (B) a discharge fluid fraction substantially free of the contaminant. A method for decontaminating an intake fluid may comprise (a) optionally reducingor oxidizing the contaminant in a fluid reactor to form a reduced contaminant or an oxidized contaminant; (b) adsorbing the contaminant (e.g., the reduced contaminant or the oxidized contaminant or the unreacted contaminant) to an adsorbent to form a contaminant-adsorbent material; (c)

forming a fluid reactor output stream comprising the contaminant-adsorbent material; (d) optionally combining a portion of the fluid reactor output stream into the intake stream; (e) fractionating up to all of the fluid reactor output stream in a catalyst recovery unit (CRU) comprising a porous membrane into (i) a CRU retentate comprising the contaminant-adsorbent material and/or (ii) a CRU permeate substantially free of the contaminant, wherein the CRU filtrate forms a first discharge stream; (f) fractionating the CRU retentate in a contaminant-concentrating module (DeWRS) comprising a DeWRS porous membrane oriented in a vertical position, into (i) a DeWRS retentate comprising the contaminant-adsorbent material and/or (ii) a DeWRS permeate substantially free of the contaminant, wherein the DeWRS filtrate forms a second discharge stream; (g) gathering the contaminant-adsorbent material in the DeWRS retentate into a contaminant slug; (h) fractionating the contaminant slug in a contaminant-concentrating mixer tank (DeWMT) comprising a DeWMT porous membrane into (i) a DeWMT retentate comprising the contaminant-adsorbent material and/or (ii) a DeWMT permeate substantially free of the contaminant, wherein the DeWMT filtrate forms a third discharge stream; (i) adding acid from an acid storage tank to the DeWMT retentate comprising the contaminant-adsorbent material to form an acidified DeWMT retentate; (j) mixing the acidified DeWMT retentate (e.g., by bubbling a gas through the contents of the contaminant-concentrating mixer tank) to desorb the contaminant from the adsorbent and form a desorbed contaminant stream, a desorbed adsorbent stream, and, optionally, a residual contaminant-adsorbent material; (k) optionally combining up to the entire desorbed absorbent stream into the intake stream; (l) combining in a rinse tank the desorbed contaminant stream with sufficient base to form a contaminant precipitate and a rinse water tank supernatant, wherein the rinse water tank supernatant forms a fourth discharge stream; and/or (m) optionally conveying the residual contaminant-adsorbent material to the acid storage tank, wherein the contaminant precipitate forms the contaminant solid fraction and the first, second, third, and fourth discharge streams together form the discharge fluid fraction.

According to some embodiments, reducing the contaminant in a fluid reactor to form a reduced contaminant may comprise photo reducing the contaminant. An intake fluid may comprise one or more contaminants. For example, an intake fluid may comprise chromium (e.g., hexavalent chromium, trivalent chromium). A reduced contaminant may comprise trivalent chromium in some embodiments. According to some embodiments, an adsorbent may comprise titanium (e.g., titanium oxide).

A CRU porous membrane and/or a DeWRS porous membrane may (independently) comprise, for example, a ceramic membrane. A decontamination method may comprise, in some embodiments, operating the CRU porous membrane as a crossflow membrane. A decontamination method may comprise, in some embodiments, operating the DeWRs porous membrane as a dead-end membrane. According to some embodiments, a decontamination method may comprise concentrating the contaminant-adsorbent material over several successive steps. For example, the concentration of the contaminant-adsorbent material in the CRU retentate may be from about 10 times to about 20 times higher than the concentration of the contaminant-adsorbent material in the fluid reactor output stream. For example, the concentration of the contaminant-adsorbent material in the contaminant trap slug may be from about 10 times to about 20 times higher than the concentration of the contaminant-adsorbent material in the CRU retentate. In some embodiments, a decontamination method may comprise pulsing the DeWRS porous membrane with a fluid shock. A method may include conveying the DeWRS retentate to the contaminant-concentrating mixer tank under pressure (e.g., air pressure), according to some embodiments.

A decontamination method may comprise adding an acidic composition (e.g., comprising sulfuric acid) to a contaminant-concentrating mixer tank at a temperature of about 40° C. to about 60° C., at a concentration of up to about 5 wt. %, and/or at a pH of less than about 1. A method may comprise conveying make-up acid from a make-up acid storage tank to the acid storage tank.

In some embodiments, a decontamination method may comprise maintaining constant the portion of the fluid reactor output stream combined into the intake stream and the portion of the fluid reactor output stream fractionated in the catalyst recovery unit. Flow rate of each discharge stream may be, independently, about 1 gallon per minute to about 500 gallons per minute.

The present disclosure relates, in some embodiments, to methods for preventing, reducing, or removing fouling of at least a portion of a filtration membrane in a continuously operating filtration system comprising the filtration membrane. A method may comprise, for example, applying to the membrane at least one dynamic shock comprising at least one pulse of counter-flow directed pressure, wherein the duration of each pulse is up to about one second (e.g., substantially instantaneous, up to about ¼ second, up to about ½ second, up to about ¾) and the pressure is sufficient to form and substantially immediately implode cavities in fluid located throughout the membrane. In some embodiments, applying the at least one dynamic shock results in substantially no change in fluid flow at the membrane. Thus, dynamic shock may be applied to a filtration membrane during operation without substantial loss of flow (e.g., without slowing or reversal of flow) according to some embodiments. Dynamic shock pulses may be repeated as often as desired.

The present disclosure further relates, in some embodiments, to methods for applying a dynamic shock to a filtration membrane in a continuously operating filtration system. A method may comprise, for example, accumulating energy to form a shockwave (e.g., in a chamber separate from the system), maintaining the stored energy separate from the filtration system, and/or releasing the stored energy in the system (e.g., opening valves to connect the pressure chamber and the system) to create a reverse shockwave. Application of a dynamic shock may result in substantially no change in fluid flow at the membrane. In some embodiments, fluid need not be flowing through a membrane to be subjected to dynamic shock. For example, dynamic shock may be applied to a filtration membrane when there is little or no flow through the membrane. A shock wave may be initiated, in some embodiments, within and/or downstream from a membrane.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates, in some embodiments, to apparatus, systems, and methods for reduction and/or removal of one or more heavy metals (e.g., heavy metals, chromium, phosphorous, phosphorous compounds, nitrogen, nitrogen compounds) from a feed composition (e.g., a fluid).

The present disclosure relates, in some embodiments, to efficient defouling mechanisms for removing foulants in a filtration membrane. According to some embodiments, the present disclosure relates to filtration membranes optimized for use with the disclosed defouling mechanisms.

Figure 1A:
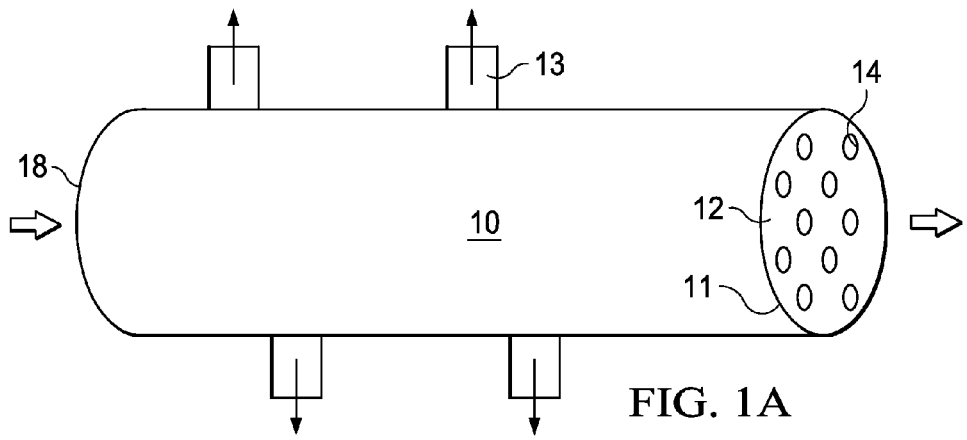
FIG. 1A illustrates a perspective view of a filtration membrane according an example embodiment of the disclosure.
Figure 1B:
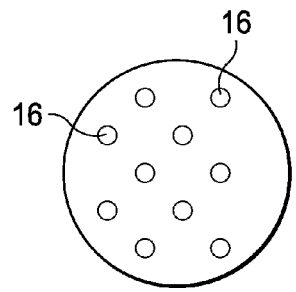
FIG. 1B illustrates a section view of the filtration membrane shown in FIG. 1A.

FIG. 1A is a schematic diagram illustrating an exemplary filtration membrane 10, and FIG. 1B is a schematic cross-sectional view of the filtration membrane 10 shown in FIG. 1A. The illustrated filtration membrane 10 includes a porous substrate 12 having a plurality of longitudinal channels 14 defined therein. In the illustrated embodiment, membrane films 16 are disposed on the surface of the channels 14. Contaminated media may be fed into filtration membrane 10 at a first end 18. The membrane films 16 may be operable to separate contaminated media into a permeate fluid that was able to pass through the membrane film 16 and a retentate fluid that exits at a second end 11 of the filtration membrane 10. The permeate fluid may pass through the pores (not shown) of the substrate 12 and exit the filtration membrane 10 through at least one outlet 13. Both the permeate and retentate fluids may undergo further treatment such as additional filtration or decantation. As used herein, "contaminated media" is a fluid that contains undesirable organic, inorganic products, metals, and possibly microbial cells or other microorganisms. Although contaminants are undesirable in the sense that they are usually toxic when ingested or contacted by humans, the term "undesirable" should not be understood to be restricted to such toxic substances.

In a process of using the filtration membrane 10 to decontaminate contaminated media, the performance of the filtration membrane 10 may decline due to organic, inorganic and biological fouling mechanisms in the process. For example, excessive fouling of the substrate 12 and/or the membrane films 16 may decrease flux, increase cross flow and transmembrane pressure, and increase energy consumption.

Figure 2:
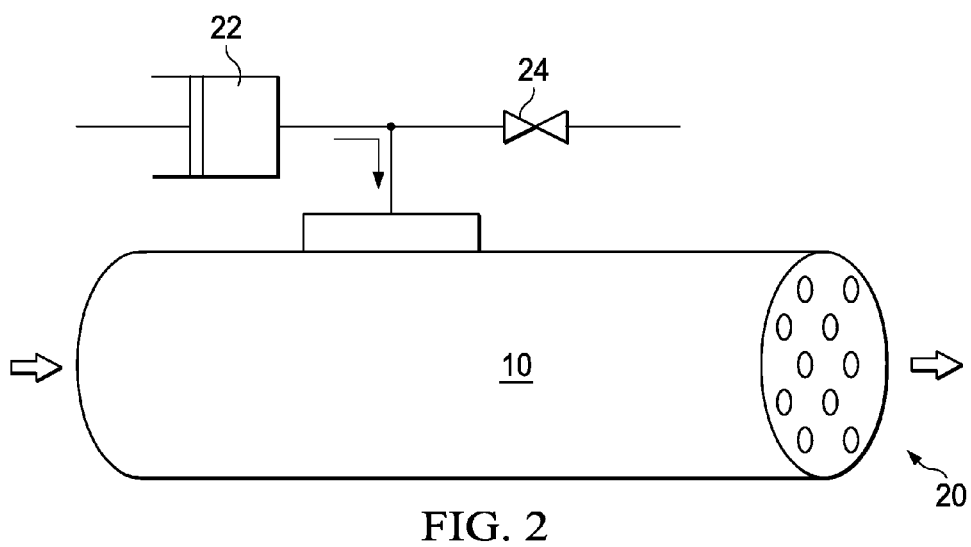
FIG. 2 illustrates a filtration system having a defouling mechanism according an example embodiment of the disclosure.

FIG. 2 illustrates a schematic diagram of a filtration system 20 having a defouling mechanism. The filtration system 20 includes the filtration membrane 10 shown in FIGS. 1A and 1B, and a piston 22 and a valve 24 connected to the permeate outlet 13 of the filtration membrane 10. In operation, the valve 24 may remain open until the filtration process needs to be paused for defouling of the substrate 12 and the membrane films 16. In an embodiment, a back-pulse or back-wash of the permeate fluid may be applied by closing the valve 24 and using the piston 22 to push the permeate fluid back through the substrate 12 and across the membrane films 16. The shearing force of the permeate fluid caused by the movement of the displaced volume of permeate fluid may release some of the foulants to be released from the substrate 12 and/or the membrane films 16. Such a back-pulse or back-wash created by the piston 22 may have inefficiencies. First, since the back-pulse or back-wash causes the permeate fluid to return to the concentrate side of the membrane film 16, the filtration of the amount of returned fluid is wasted, and the filtration time is extended. Also with these defouling mechanisms, channeling of the back-pulse or back-wash fluid may result in uneven cleaning of the substrate 12 and/or the membrane films 16. The back-pulse or back-wash fluid tends to flow back through the cleaner elements, not the fouled elements, due to reduced pressure drop. As such, the worst fouled elements received less cleaning and will continue to degrade over time.

Figure 3:
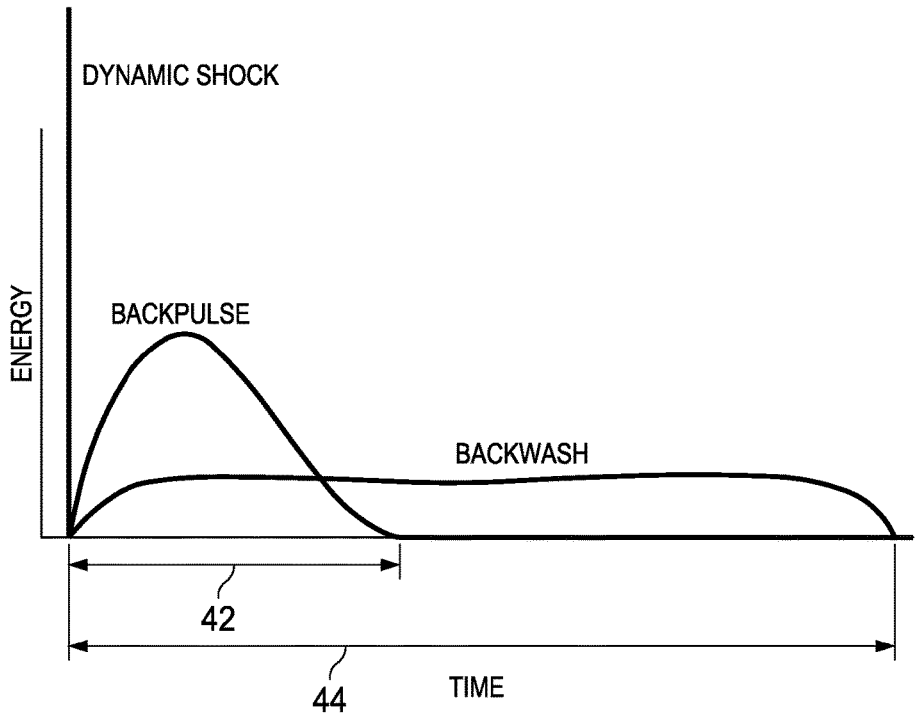
FIG. 3 illustrates an energy profile of a filtration system having a defouling mechanism according an example embodiment of the disclosure.

FIG. 3 is a schematic diagram showing the energy profiles of a back-pulse and a back-wash over time. Period 42 in FIG. 3 reflects the duration of the backward flow of the permeate fluid in a back-pulse. Period 44 reflects the duration of the backward flow of the permeate fluid in a back-wash. Due to the time required for the physical movement of fluid across the substrate 12 and the membrane films 16, the period 42 for a back-pulse ranges in the seconds while the period 44 for a back-wash ranges in the minutes.

Figure 4:
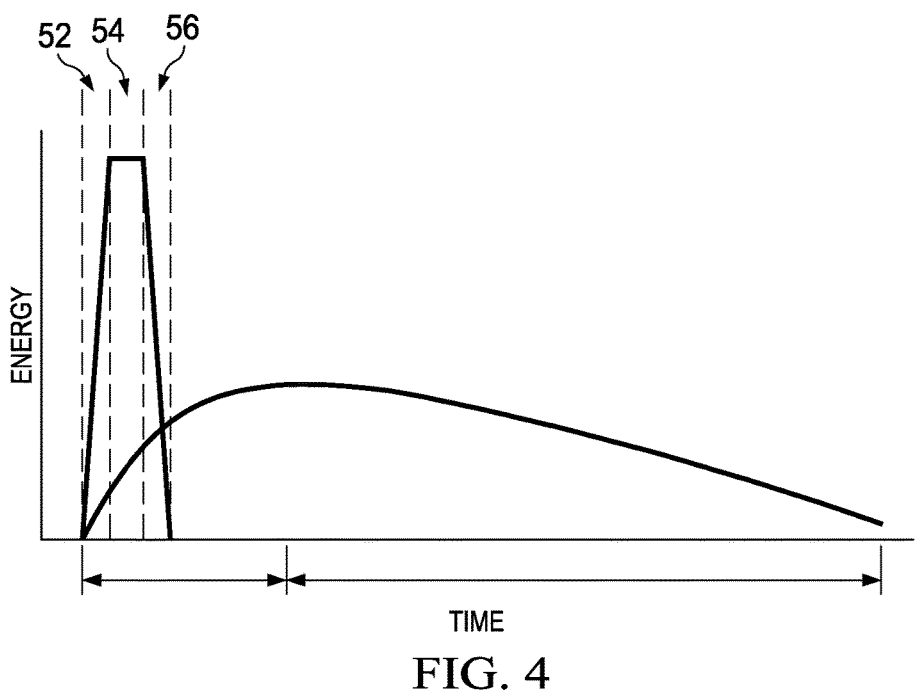
FIG. 4 illustrates a detailed energy profile of a filtration system having a defouling mechanism according an example embodiment of the disclosure.

Also shown in FIG. 4 is an exemplary energy profile of an embodiment of a dynamic shock that may be used to clean the membrane 10. Compared to a back-pulse or a back wash, the illustrated dynamic shock introduces an amount of energy that is sufficiently high and in such a short duration so as to create cavitation in the fluid proximate to the substrate 12 and membrane films 16. In an embodiment, the cavitation of the dynamic shock is operable to form and substantially immediately implode cavities in the fluid located throughout the membrane 10, thereby rupturing biological matters and releasing organic and inorganic matter from the substrate 12 and membrane films 16. An exemplary approach for creating cavitation is to subject the fluid in the membrane 10 to rapid changes of pressure to cause the formation of cavities where the pressure is relatively low.

Figure 5:
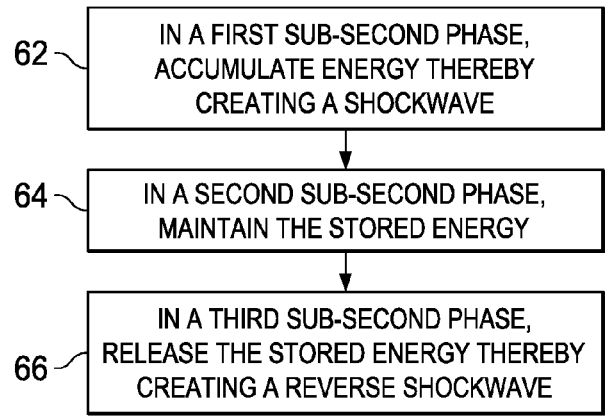
FIG. 5 illustrates a block diagram demonstrating an example embodiment of a defouling method.

FIG. 4 a schematic diagram showing a focused view of an exemplary energy profile of the illustrated dynamic shock. FIG. 5 is a flow chart illustrating an exemplary method for producing the dynamic shock illustrated in FIGS. 3 and 4. The illustrated embodiment of the dynamic shock may include three sub-second phases 52, 54, and 56. In step 62, the first phase 52 may include a rapid accumulation of energy to create a first shockwave throughout the fluid and foulants in the membrane 10. The energy transfer to the fluid and foulants in the membrane 10 may be affected with a rapid pressure increase. In such an embodiment, no physical movement of the fluid in the membrane 10 is required, and as such, the energy transfer in the first phase 52 may be achieved in less than a second. In step 64, the second phase 54 may or may not include holding the energy transferred to the fluid and foulants in membrane 10 for less than one second. However, in the second phase 54, there may be a limit as to how quickly the valves may be opened and closed. In step 66, the third phase 56 may include a rapid release of the energy stored creating an exploding reverse shock wave throughout the fluid and foulants in the membrane 10, thereby either destroying the foulants or lifting them off the substrate 12 or membrane films 16. Again, no physical movement of the fluid in the membrane 10 is required in the third phase 56, and as such, the energy transfer in the third phase 56 may be achieved in less than a second. The first shock wave produced in the first phase 52 and the second reverse shock wave produced in the third phase 56 both may create cavitations at the substrate 12 and the membrane films 16.

It is to be appreciated that a dynamic shock is distinct from a back-pulse or a back-wash, and offers performance improvements in at least several aspects. The phases of a dynamic shock may be carried out in less than one second, and substantially little or no permeate is lost back to the concentrate side of the membrane films 16. Consequently, a dynamic shock can be repeated as frequently as desired to prevent matter from fouling the membrane 10. For example, in an embodiment, dynamic shocks may be applied to the membrane 10 about once per minute to prevent the lodging of foulants before they become fixed on the membrane 10 and accumulate. According to some embodiments, dynamic pulses may be applied from about once per seceond to about once per 5 seconds, to about once per 15 seconds, to about once per 30 seconds, to about once per 45 seconds, to about once per 60 seconds, to about once per 75 seconds, to about once per 90 seconds, to about once per 2 minutes, to about once per 5 minutes, or longer. Bursts of multiple pulses (e.g., about 2 to about 5 pulses all applied within about 1-10 seconds) may be applied at the same frequencies as single pulses (e.g., one burst repeated about every minute).

By relying on cavitation instead of physical shearing force to clean the membrane 10, the effect of water channeling becomes irrelevant, and the cleaning of the membrane 10 may be performed consistently throughout the membrane 10. It is to be further appreciated that the ability for more efficient and consistent cleaning throughout the membrane 10 allows for packing more membrane films 12 and channels 14 into one membrane 10.

Figure 6A:
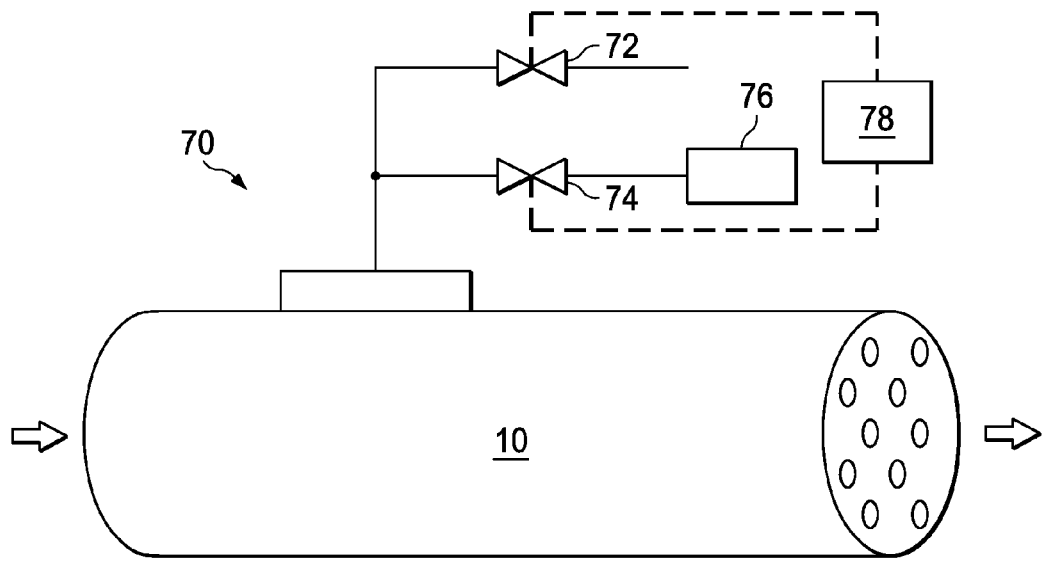
FIG. 6A illustrates a filtration system having a defouling mechanism according an example embodiment of the disclosure.

The dynamic shock of the present disclosure may be generated with any mechanism for a rapid release of energy to the membrane surface, such as the Hammer effect, shot peaning to remove paint, and sonification. FIG. 6A is a schematic diagram of an exemplary filtration system 70 operable to generate a dynamic shock for defouling the membrane 10. In an embodiment, the system 70 may include the filtration membrane 10 discussed in the present disclosure. To provide dynamic shock for defouling the membrane 10, the system 70 may include a valve 72 in the permeate line for controlling the flow of the permeate out of the membrane 10. The permeate line may be connected to a compressed air or steam supply 76, and a valve 74 may be disposed in parallel to the valve 72 for controlling the flow of compressed air or steam into the permeate line. The valves 72 and 74 may be controlled by a controller 78, which may be configured to be operable to manipulate the valves 72 and 74 to provide a dynamic shock. In an embodiment, the controller 78 may close the valve 72 to hydraulically isolate or close the permeate line, which creates a brief water hammer (low energy). The controller 78 may then open the valve 74 immediately thereafter, which would inject compressed air or steam into the permeate line and rapidly release high pressure into the permeate. In an embodiment, the pressure in the compressed air or steam line is 100 to 200 psi greater than the pressure in the permeate line. As such, in an embodiment, when the valve 74 is opened, the pressure in the permeate line can rapid increase by 100 to 200 psi, which would create a dynamic shock wave into the permeate fluid of the membrane 10, and throughout the rest of the membrane 10. In an embodiment, a suitable degas technology may be used to remove the air that was injected to effect the shock wave. The degas technology may prevent loss of feed pump pressure.

In an embodiment, the valve 74 is opened and closed as quickly as physically possible to complete the first subsecond phase 52 of a dynamic shock. In an embodiment, the valve 74 may be opened and closed in less than 0.50 second; in an optimized embodiment, the valve 74 may be opened and closed in less than 0.25 second. In an embodiment, after less than a second of holding the elevated pressure, the second subsecond phase 54 may be completed. In the third subsecond section, the rapid high pressure in the permeate fluid may be released by opening valve 72 in the permeate line, which creates a rapid de-pressurization in the membrane 10 and causes a second reverse dynamic shock wave. This may be considered a double acting effect. Again, the valve 72 may be opened as quickly as possible. In some embodiments, opening valve 72 may take less than 0.50 second or less than 0.25 second. The above described process of operating the system 70 to provide the dynamic shock may be substantially prevent the fouling of the membrane 10, thereby allowing a continuous filtration process. It is to be appreciated that other suitable methods could be used to provide a dynamic shock. For example, a diaphragm (not shown) or ram (not shown) may transfer the energy required rapidly without moving or displacing the permeate fluid in the membrane 10.

Figure 6B:
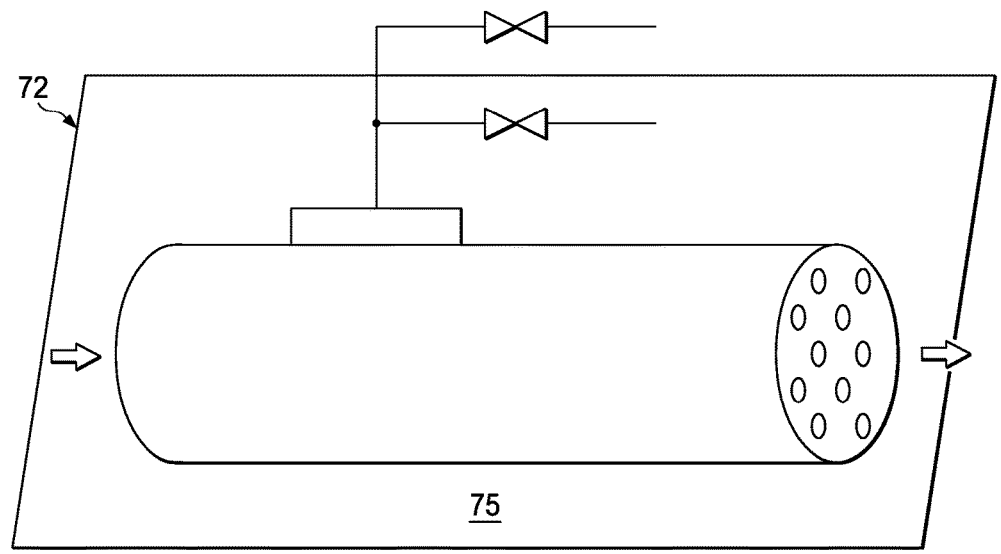
FIG. 6B illustrates a filtration system having a defouling mechanism according an example embodiment of the disclosure.

FIG. 6B is a schematic diagram showing an orientation of the exemplary filtration system 70 configured to reduce damping of energy transfer in the membrane 10. In an embodiment, a design consideration is a substantial elimination of inertia or elasticity in all parts of the membrane 10 in order to reduce damping of the dynamic shock, which would reduce its effectiveness on cavitating or lifting foulants. An embodiment of reducing or eliminating inertial in system 70 may include substantially eliminating air gaps, which may absorb the energy of the dynamic shock like a spring or damper. In another embodiment, membrane 10 may be disposed horizontally relative to the ground 75 to reduce or eliminate air trapped in the membrane 10 and its housing 75. Similarly, the membrane 10 may be constructed of a material that is rigid. For example, for the purpose of reducing damping, stainless steel may be preferred over PVC. In an embodiment, the dynamic shock may be more effective if membrane 10 is made of silicon carbide (SiC) over other membrane materials and designs because there is less dampening by the membrane films 16 and substrate 12 in a SiC membrane. Moreover, in an embodiment, the compressed air or steam may be applied directly to the module to reduce or eliminate dampening effects. The use of compressed air may be preferred as the use of steam can collapse and dampen the impact of a dynamic shock.

Figure 7A:
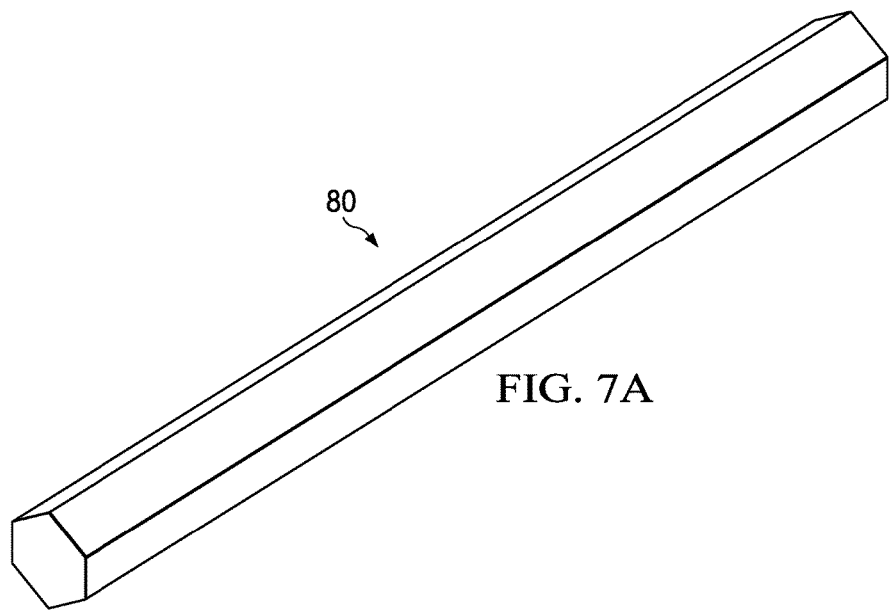
FIG. 7A illustrates a perspective view of a silicon carbide filtration membrane according an example embodiment of the disclosure.
Figure 7B:
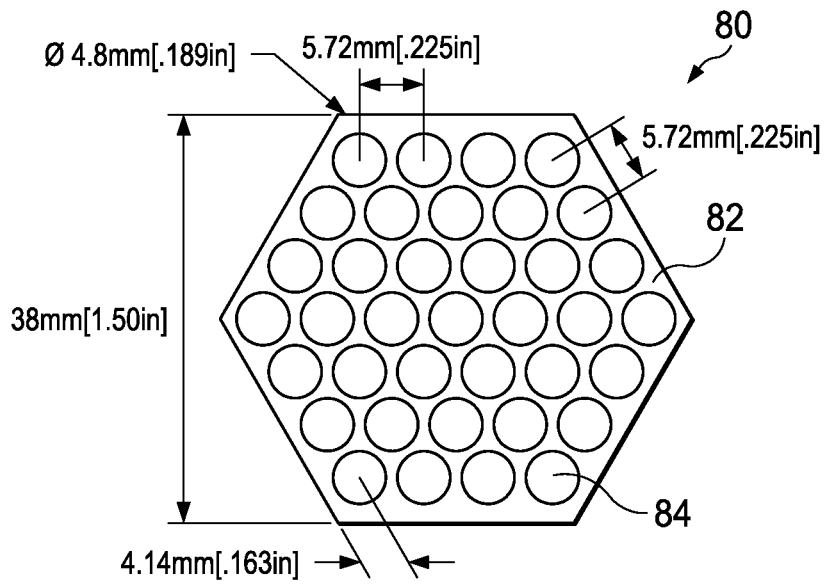
FIG. 7B illustrates a section view of the filtration membrane shown in FIG. 7A.

FIG. 7A illustrates an exemplary embodiment of a membrane 80 made of SiC. FIG. 7B is a cross-sectional view of the SiC membrane 80. The SiC membrane 80 may be configured similarly to the membrane 10 and is suitable for use in any embodiments of filtration membranes or filtration systems disclosed herein. Due to its hydrophilic nature, the SiC membrane 80 may be used for filtration of a variety of foulants, including oil-based foulants, organic and inorganic substances, and biological foulants.

The SiC membrane 80 may allow for reduced transmembrane pressure (TMP) because of the strength of SiC substrate 82 over Alpha Alumina. This allows for the economical use of a smaller pore size. Additionally, the SiC membrane 80 has smaller particles which allows for thinner wall and a thinner membrane. The illustrated dimensions, including the hexagonal cross-sectional shape of the SiC membrane 80, the separations between channels 84, the width of the SiC membrane 80, and the distance of the channels 84 from the edge of the SiC membrane 80, have been substantially optimized for flux, TMP, and cross flow pressure drop. In an embodiment, the separations between the channels 84 (from center to center) may preferably range between 0.2 to 0.25 inches. In an embodiment, width of the SiC membrane 80 may preferably range between 1.25 to 1.75 inches. In an embodiment, the distance between the center of the outside channels 84 to the edge of the SiC membrane 80 may preferably range between 0.14 to 0.18 inches. It is to be appreciated that the above discussed dimensions may be varied according to the needs of particular application.

It is to be appreciated that the filtration membranes and filtration systems of the present disclosure may be integrated with a variety of decontamination technology, such as photocatalytic technology. The integration may be accomplished without break tanks, loss of excessive line pressure, and/or booster pumps.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

In some embodiments, a decontamination system for removing contaminants from a fluid comprises a filtration unit and a recovery unit. The filtration unit is operable to receive an adsorbent and the fluid comprising the contaminants. The filtration unit comprises a filter operable to separate the fluid from the adsorbent and contaminants adsorbed onto the adsorbent, the filter comprising a first portion and a second portion separated by a membrane. The filtration unit also comprises a first filter output in cooperation with the first portion and operable to receive the adsorbent and the contaminants adsorbed onto the adsorbent. The filtration unit also comprises a second filter output in cooperation with the second portion and operable to receive the effluent. The recovery unit is operable to receive the adsorbent and the contaminants adsorbed onto the adsorbent from the first filter output of the filtration unit. The recovery unit is also operable to separate the adsorbent and the contaminants adsorbed onto the adsorbent. The recovery unit comprises a stripping unit operable to strip the contaminants from the adsorbents and a separation unit operable to separate the adsorbent to a first recovery output and the contaminants to a second recovery output.

A filtration system for separating contaminants from a fluid in a decontamination system, in some embodiments, is configurable to receive the fluid comprising the contaminants and an adsorbent. The filtration system comprises a filter, a first output, and a second output. The filter is operable to separate the fluid from the adsorbent and the contaminants adsorbed onto the adsorbent. The filter comprises a first portion and a second portion separated by a membrane. The first output is in cooperation with the first portion and operable to receive the adsorbent and the contaminants adsorbed onto the adsorbent. The second output is in cooperation with the second portion and operable to receive the effluent.

According to some embodiments, a method of removing a contaminant from a fluid comprises feeding an adsorbent into the contaminated fluid. The method further comprises separating, in a first separation treatment, the adsorbent and contaminant adsorbed onto the adsorbent from the fluid. The method further comprises separating, in a second separation treatment, the contaminant from the contaminant adsorbed onto the adsorbent. The method further comprises recovering the adsorbent and providing the recovered adsorbent for reuse in feeding into contaminated fluid.

Direct treatment costs associated with contaminated fluid treatment processes may include the expenses for the clarifier/filtration costs, pH control, alkalinity control, polymer addition, coagulant addition, sludge thickening, and sludge disposal (land fill). By reducing or eliminating some of these expenses, the cost of waste fluid treatment may be reduced. Periodic or continuous addition of a new supply of coagulants is required in some treatment processes because coagulants may chemically react as they are added to the contaminated fluid and thus become irreversibly consumed. The reacted coagulants and the coagulated contaminants end up in the sludge or solids, which are typically land filled. Using adsorbents that do not react chemically during the treatment process may allow the adsorbents to be separated and recovered from the contaminants. And reusing the recovered adsorbents may reduce or eliminate the need for a new supply of adsorbents, thereby reducing the cost of treatment. As discussed above, in some clarifier operations, a polymeric material may be added to aid in the settling of solids in the clarifier. But the addition of the polymeric material increases costs. By reducing or eliminating the need for the addition of polymeric materials, a cost reduction may be achieved.

One aspect of the present disclosure relates to treating contaminated fluid with suitable adsorbents that are operable to adsorb the contaminants onto the surface of the adsorbents and to be stripped of the contaminants with a desorption process. Using such adsorbents instead of conventional coagulants allows for the recovery of adsorbents for reuse. The recovery and reuse of the adsorbents may reduce the cost of treatment significantly by reducing or eliminating the need for new addition of fresh coagulants and polymeric material into the treatment process. Applying a semi-batch or continuous process by continuously adding adsorbents into the treatment may also improve the efficiency of the overall decontamination process.

As used herein, the term "contaminated fluid" is a fluid that contains undesirable organics, inorganics, metals, and possibly microbial cells or other microorganisms. Although contaminants are undesirable in the sense that they are usually toxic when ingested or contacted by humans, "undesirable" should not be understood to be restricted to such toxic substances. As used herein, the term "decontaminated effluent" means that the undesirable substances in the contaminated fluid have been altered or modified into a desirable or an acceptable substance, again, usually a substance that is non-toxic. Normally such alteration or modification of any organic substance is achieved by decomposing the substance into by-products having a smaller molecular weight than the original contaminated fluid. It should also be noted that the terms "fluids" and "effluents" should not be read or interpreted as being limited to liquids. Rather, such terms should be interpreted to include gases, such as air.

Figure 8:
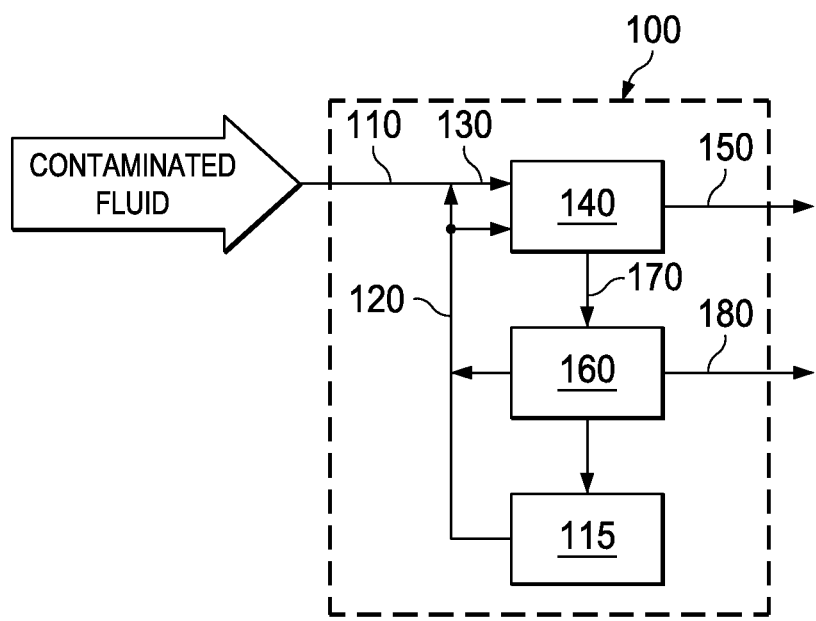
FIG. 8 illustrates a block diagram demonstrating an example embodiment of a decontamination system.

FIG. 8 is a high-level schematic diagram illustrating an example decontamination system 100 according to the present disclosure. System 100 receives a feed stream 110, which provides incoming contaminated fluid in need of filtration. In an embodiment, feed stream 110 may include a variety of contaminants, including various organic and inorganic compounds, such as metals, dissolved solids, and color compounds. An example list of metal contaminates includes phosphorus, lead, iron, manganese, technetium, arsenic, silver, gold, platinum, mercury, and chromium. Feed stream 110 may be mixed with suitable adsorbents provided from a reservoir 115 via a stream 120, resulting in a slurry stream 130. It is to be appreciated that suitable adsorbents may be any particle or mixture of particles that have good adsorptive capacity for the contaminants in feed stream 110 but may be stripped of the contaminants using a desorption process. Any insoluble particles described in the present disclosure may be a suitable adsorbent. For example, in an embodiment where phosphorus compounds are present in feed stream 110, titanium dioxide, $TiO_2$, may be a suitable adsorbent. Also shown in FIG. 8 is a filter unit 140 that receives slurry stream 130 and separates the contaminants and adsorbents from the fluid in slurry stream 130. Filter unit 140 may output a decontaminated stream 150. In an embodiment, the separated contaminants and adsorbents may be removed from system 100 as waste. In another embodiment, system 100 may include a desorption unit 160 that receives a mixture 170 separated in filter unit 140 and comprising the contaminants and adsorbents. Desorption unit 160 may be operable to strip the contaminants from the adsorbents and recycle the recovered adsorbents back to filter unit 140 and/or stream 120 for reuse. Contaminants 180 may be removed from desorption unit 160 and disposed as waste and/or recovered. In an example embodiment, contaminants 180 recovered from desorption unit 160 may be subjected to an additional recovery process to recover the contaminants for reuse. For example, when contaminants, such as hexavalent chromium, are mixed with adsorbents, such as $TiO_2$, and passed through filter unit 140 and desorption unit 160, the resultant contaminants separated from the adsorbents may be subjected to a boiling salt bath so as to recover the chromium.

Figure 9:
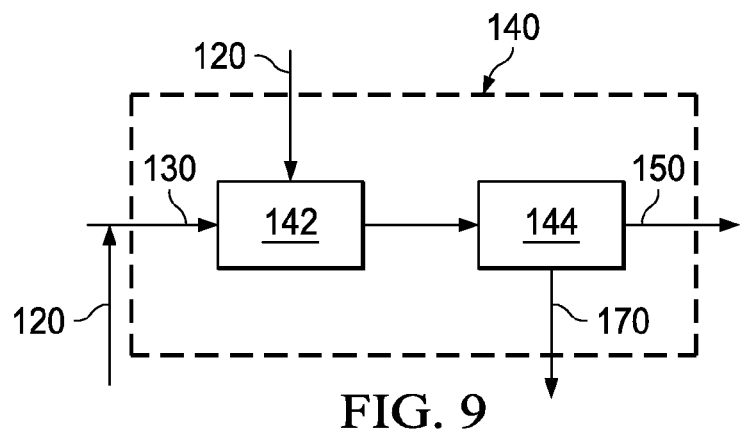
FIG. 9 illustrates an example embodiment of a filter unit constructed according to the disclosed principles.

FIG. 9 is a schematic diagram illustrating an example embodiment of filter unit 140. As illustrated, filter unit 140 may include an optional mixer 142 that allows the contaminants to interact with the adsorbent to form coagulated complexes of the contaminants and adsorbents. In an embodiment, mixer 142 may include an active mixing mechanism for dispersing the adsorbents in the contaminated fluid. In another embodiment, the optional mixer 142 may be a simple holding tank, container, or any other structures that stores the mixture of the contaminated fluid and the adsorbents. The adsorbents may be introduced into filter unit 140 and/or added to the contaminated fluid stream 110 prior to entering filter unit 140.

Filter unit 140 may further include a suitable filter 144 for separating the macromolecules comprising the adsorbents and the adsorbed contaminants. Filter 144 may be a membrane that includes a wall (not shown) separating the interior of filter 144 from its exterior and pores (not shown) defined in the wall of filter 144. As slurry stream 130 passes through the interior of filter 144, the pores of filter 144 allow the movement of decontaminated fluid from the interior to the exterior of filter 144. Filter 144 may have an average pore size that is larger than the anticipated size of the macromolecules formed by the contaminants being adsorbed on the adsorbents. In an embodiment, the pore size of filter 144 is sufficiently large so as to induce micro-filtration of the treated slurry while only permitting negligible amounts of the contaminant-adsorbent macromolecules to permeate through the pores of filter 144. In another embodiment, the pore size of filter 144 may be sized for ultra-filtration.

It is to be appreciated that during the operation of system 100, the flow rate of the slurry 130 and the pressure across the membrane of filter 144 may be maintained to allow for either dead-end filtration or cross-flow filtration. In dead-end filtration, the contaminant-adsorbent macromolecules are directed towards and collect on the wall of filter 144. In cross-flow filtration, two directional components are employed. First, a substantial linear velocity is maintained through the filter, i.e., parallel to the wall of filter 144. Second, a substantial pressure differential, also referred to as a transmembrane pressure, is applied across filter 144. The transmembrane pressure drives the decontaminated fluid through the wall of filter 144 while the high linear velocity continually removes most of the contaminant-adsorbent macromolecules away from the wall of the filter 140. This prevents the buildup of the contaminant-adsorbent macromolecules on the wall of the filter 140.

As shown in FIG. 9, the decontaminated stream may exit filter unit 140 from filter 144. The contaminant-adsorbent macromolecules can be periodically removed from filter 144 in various ways. For example, high pressure air can be used to create a "shock wave" on the interior of filter 144. This is more fully disclosed in U.S. patent application Ser. No. 08/205,699, entitled "Method and System for Photocatalytic Decontamination," filed Mar. 3, 1994, which is incorporated by reference herein for all purposes. Alternatively, back flushing and back pulsing techniques, as are readily known to one of ordinary skill in the art, can also be employed to remove the contaminant-adsorbent macromolecules.

Figure 10:
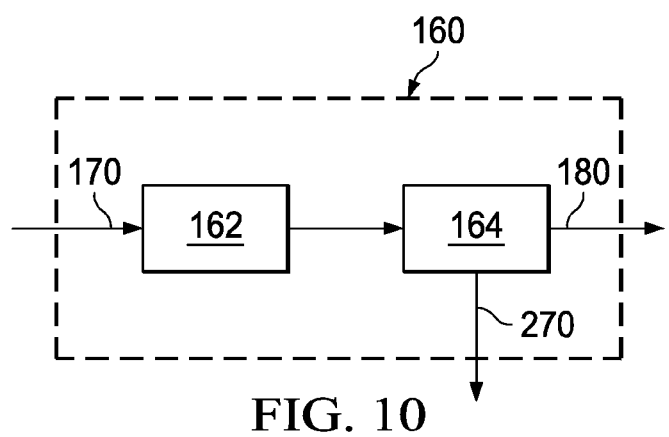
FIG. 10 illustrates an example embodiment of an adsorbent recovery unit constructed according to the disclosed principles.

The contaminant-adsorbent macromolecules may be provided to desorption unit 160 to strip the contaminants from the adsorbents. Desorption unit 160 may be configured according to a variety of desorption processes known in the art. In an embodiment, the desorption unit may include a heating unit to raise the temperature and thereby promote the natural desorption of the contaminants from the adsorbents. In the example embodiment shown in FIG. 10, desorption unit 160 includes stripping tank 162 where the contaminant-adsorbent macromolecules in the mixture 170 is introduced to an acid bath to separate and/or dissolve the contaminants from the adsorbents. It is to be understood that the bath may be an acid bath, base bath, or any other type of bath known in the art suitable to separate and/or dissolve the contaminants from the adsorbents. The acid solution including the separated and/or dissolved contaminants and the adsorbents may be provided to a separation device 164 for recovering the adsorbents 270 from the acid solution. In an embodiment, the separation device 164 may be a suitable filter known in the art, such as a ceramic filter. It is to be appreciated that using adsorbents instead of coagulants in the feed stream 130 allows for the eventual separation of the adsorbents and the contaminants. This, in turn, allows for reusing of the recovered adsorbents in stream 120 and the optional recovery of contaminants, such as phosphorus and chromium compounds. In some embodiments, contaminates such as phosphorus and chromium would readily be adsorbed onto a suitable adsorbent, such as $TiO_2$. In other embodiments, it may be desirable to irradiate the contaminants with UV light to promote the adsorption of the contaminants onto the adsorbent. The UV irradiation may allow for photocatalytic oxidation and/or reduction of the contaminants to improve adsorption. Such UV irradiation may be applied to feed stream 110 and/or slurry stream 130, and such may be performed either before entering filter unit 140 or within filter unit 140. For example, lead contaminants may be oxidized to lead oxide, which may be adsorbed to $TiO_2$ more readily. In an embodiment, iron, manganese, technetium, and/or arsenic may also be oxidized in a similar fashion to promote more efficient adsorption. In another example, hexavalent chromium may be reduced to trivalent chromium, which may be adsorbed with $TiO_2$ more readily. In an embodiment, silver, gold, platinum, and mercury may also be reduced in a similar fashion to promote more efficient adsorption. In some embodiments, such as the treatment of color lignands, UV irradiation may improve adsorption even without a reduction or oxidation reaction. In preferred embodiments, the UV irradiation is preferably applied to feed stream 110 prior to combining with the adsorbent stream 120 so as to ensure a maximum exposure of surface of the contaminants to the UV irradiation. To further promote adsorption of the contaminants, UV irradiation may be additionally applied to slurry stream 130 and/or within filter unit 140.

Figure 11:
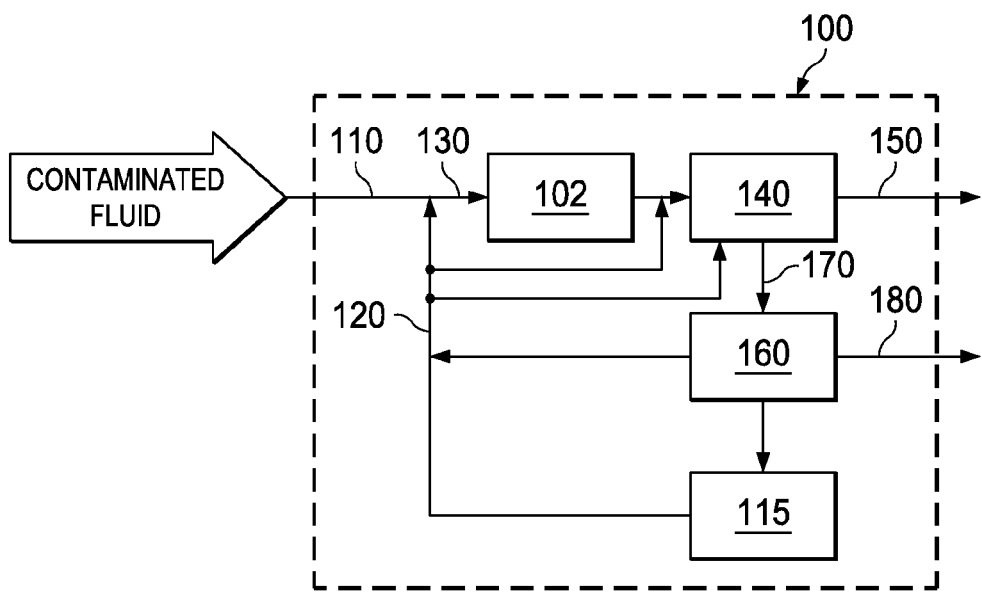
FIG. 11 illustrates an example embodiment of a decontamination system having a photocatalytic reactor constructed according to the disclosed principles.

UV irradiation may be implemented in the decontamination system 100 in a variety of configurations. In an embodiment, filter unit 140 may include a light source (not shown) configured to irradiate feed stream 110, slurry stream 130, and/or the contents of filter unit 140, such as the contents of mixer 142, with UV light to allow for a photocatalytic oxidation or reduction reaction. While filter unit 140 may include the UV light source in some embodiments, the decontamination system 100 may include one or more separate UV reactors 102 upstream of filter unit 140 as shown in FIG. 11. One or more UV reactors 102 may be configured to receive feed stream 110 and/or slurry stream 130 to allow for a photocatalytic reaction to change the composition of the contaminants in slurry stream 130 prior to being fed into filter unit 140.

Figure 12:
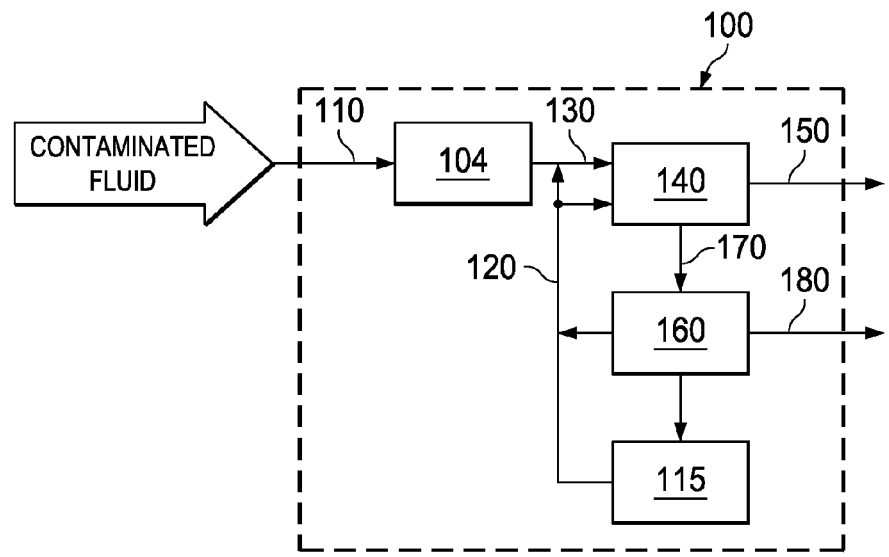
FIG. 12 illustrates an example embodiment of a decontamination system having a non-photocatalytic reactor constructed according to the disclosed principles.

In another embodiment, a non-photocatalytic oxidation or reduction of the contaminants in the contaminant fluid 110 may be affected in addition to or in replacement of the above-described UV irradiation by adding a suitable oxidizing chemical, such as chlorine, or a reducing agent, such as sodium metabisulphite, into the contaminated fluid 110 and/or into slurry stream 130. Referring to FIG. 12, the decontamination system 100 may include one or more non-photocatalytic reactors 104 which receive the suitable oxidizing or reducing agent and allows them to react with the contaminants in the contaminated fluid 110 and/or slurry stream 130. In respect to the former, the output of reactor 104 may then mix with the adsorbent to provide a slurry stream 130. In an example embodiment, the suitable oxidizing or reducing agent may be added to filter unit 140, such as in mixer 142, in addition to or in replacement of the embodiment shown in FIG. 12. In an example embodiment, slurry stream 130 in FIG. 12 may also be irradiated by UV light according to the principles described in the present disclosure to further promote the adsorption of the contaminants to the adsorption. For example, contaminated stream 110 may be passed through a UV reactor 102 and a non-photocatalytic reactor 104 prior to being combined with the adsorbents. It is to be understood herein that the adsorbents may be combined with contaminated stream 110 before being passed through filter unit 140 and/or within filter unit 140, such as in mixer 142.

Figure 13:
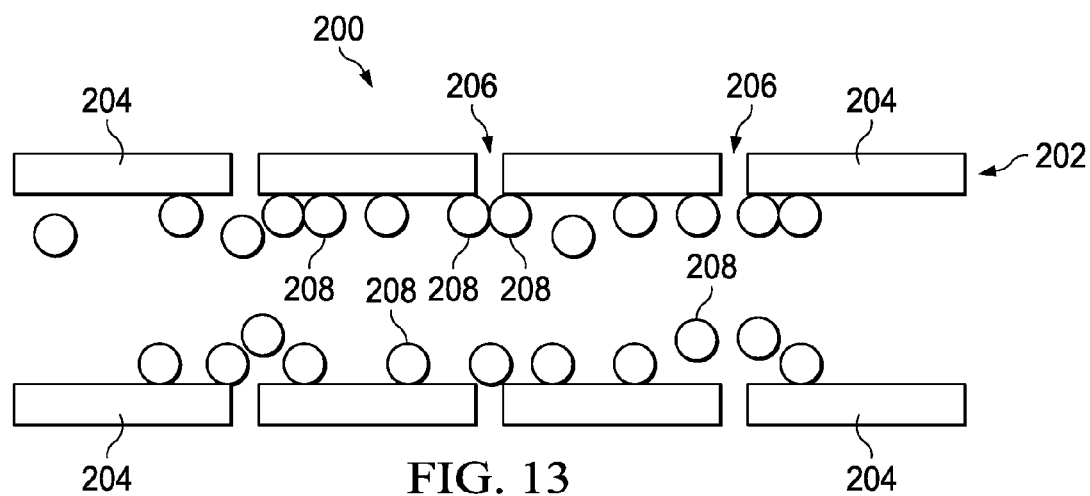
FIG. 13 illustrates a cross-sectional view of a first embodiment of an example embodiment of a filtration unit according to the disclosed principles.

Another aspect of the present disclosure relates to a filtration unit that is synergistically employed with insoluble particles. An example embodiment of such a filtration unit 200 is shown in FIG. 13, which represents a cross sectional view of a membrane 202. While membrane 202 may be configured to have a variety of shapes and sizes, the illustrated embodiment is a cylindrical membrane 202 having a sidewall 204 extending in a longitudinal direction. The sidewall 204 includes a plurality of pores 206 defined therein. As configured, membrane 202 is operable to allow the contaminated fluid comprising contaminants (not shown), adsorbents (not shown), and insoluble particles 208 to flow in a longitudinal direction along the interior of membrane 202, and pores 206 allow decontaminated fluid to pass radially to the exterior side of membrane 202.

The synergistic effects of employing insoluble particles 208 about membrane 202 may be achieved by maintaining the flow rate of the contaminated fluid and the transmembrane pressure such that filtration unit 200 is operating in cross-flow conditions. One resultant synergistic effect when the cross-flow condition is maintained is that insoluble particles 208 form a temporary membrane along the sidewall 204 of the membrane. The temporary membrane formed by insoluble particles 208, in turn, allows for increased flux across the membrane. For example, in an embodiment having a microfiltration membrane 202, the addition of a temporary membrane allows for ultra-filtration performance while maintaining the flux of a micro-filtration system. For example, in an embodiment the temporary membrane allows filtering of particles of about 1 micrometer to 1 nanometer in diameter. Typical ultra-filtration flux achieved in the industry are in the 50-100 GFD range, but a temporary membrane created by insoluble particles in a micro-filtration system can achieve flux in the 2000 GFD range.

While insoluble particles 208 may include any adsorbents disclosed in the present disclosure, insoluble particles 208 may also include substantially non-adsorptive particles. In a synergistic embodiment, insoluble particles 208 may be adsorptive and non-photocatalytic. Using adsorptive, insoluble particles 208, additional benefits may be realized in addition to the increase in flux. In an example embodiment in which insoluble, adsorptive particles are used in decontamination system 100 and a cross flow is maintained in filter 144, the resultant temporary membrane would allow for a synergistic combination of benefits, including high flux, elimination or reduction in the need for polymer addition, and recovery and reuse of adsorbent. Further advantages may be realized by using non-photocatalytic particles 208. Some of the biggest costs in a photocatalytic process include the energy cost for providing the UV light and the maintenance cost of the UV source. By running the treatment process in a non-photocatalytic system eliminates these costs and allows for significant cost savings.

Referring back to FIG. 11, an example application of the above example embodiments will now be described for a contaminant stream comprising hexavalent chromium. In a first step, an appropriate amount of citric acid is added to the contaminant stream 110 so as to increase the rate at which hexavalent chromium is reduced to trivalent chromium, once contaminant stream 130 is sent to a photocatalytic process 102. In a second step, $TiO_2$ adsorbents are added to the contaminant stream prior to and after entering filtration unit 140. In the filtration unit 140, the $TiO_2$ adsorbs with the trivalent chromium and the resultant $TiO_2$—trivalent chromium macromolecules 170 are filtered to desorption unit 160. In a third step, the $TiO_2$—trivalent chromium macromolecules are subjected to an acid bath tank 162 of desorption unit 160 and heating at about 65° C. so as to separate the $TiO_2$ and the trivalent chromium. The recovered $TiO_2$ adsorbent 270 is then recovered and recycled for use in the next batch.

Figure 14:
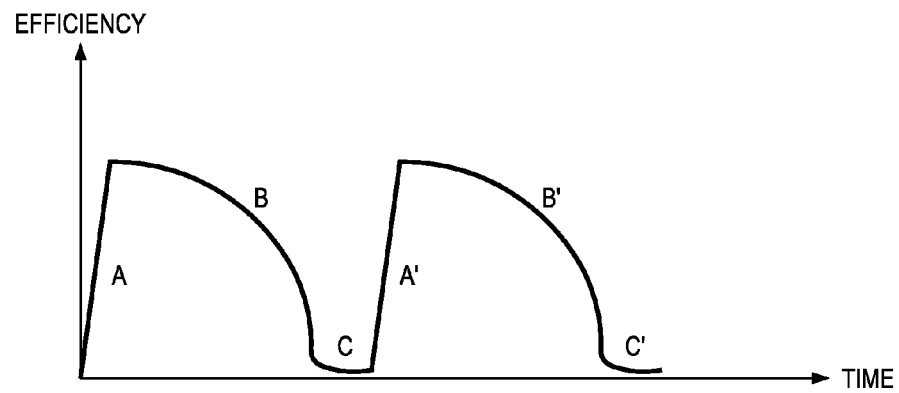
FIG. 14 is an example relationship of efficiency versus time in a semi-batch process.

In another example application, the above process was slightly modified so as to provide for a semi-batch or continuous process. In this regard, as the contaminant stream 110 is continuously added in the first step, appropriate amounts of citric acid is also continuously added to the contaminant stream prior to subjecting contaminant stream 130 to a photocatalytic process 102. In the second step, the $TiO_2$ adsorbents are also continuously added to the contaminant stream in the form of a slip stream of $TiO_2$ prior to and after entering the filtration unit 140 so as to ensure the continuous feeding of contaminant stream 130 into the filtration unit 140 will meet with sufficient quantities of the $TiO_2$ adsorbent. In the third step, a dewatering step using a ceramic membrane is performed both prior to and after entering the acid bath. In this step, the recovered $TiO_2$ adsorbent is also continuously removed from desorption unit 160 and continuously recycled back for reuse. In performing a semi-batch or continuous process, the overall decontamination process will achieve consistently excellent efficiency throughout and not suffer from drops in efficiency during each batch, as encountered in a batch process. FIG. 14 illustrates an example drop in efficiency for two separate batches. As shown in the figure, the efficiency of the decontamination process is excellent when the $TiO_2$ adsorbents are added (A). Thereafter, as the adsorbents combine with the chromium, the efficiency of the batch becomes reduced (B) due to the reduction of surface area and eventually reaches a level where the efficiency becomes very poor (C).

Figure 15:
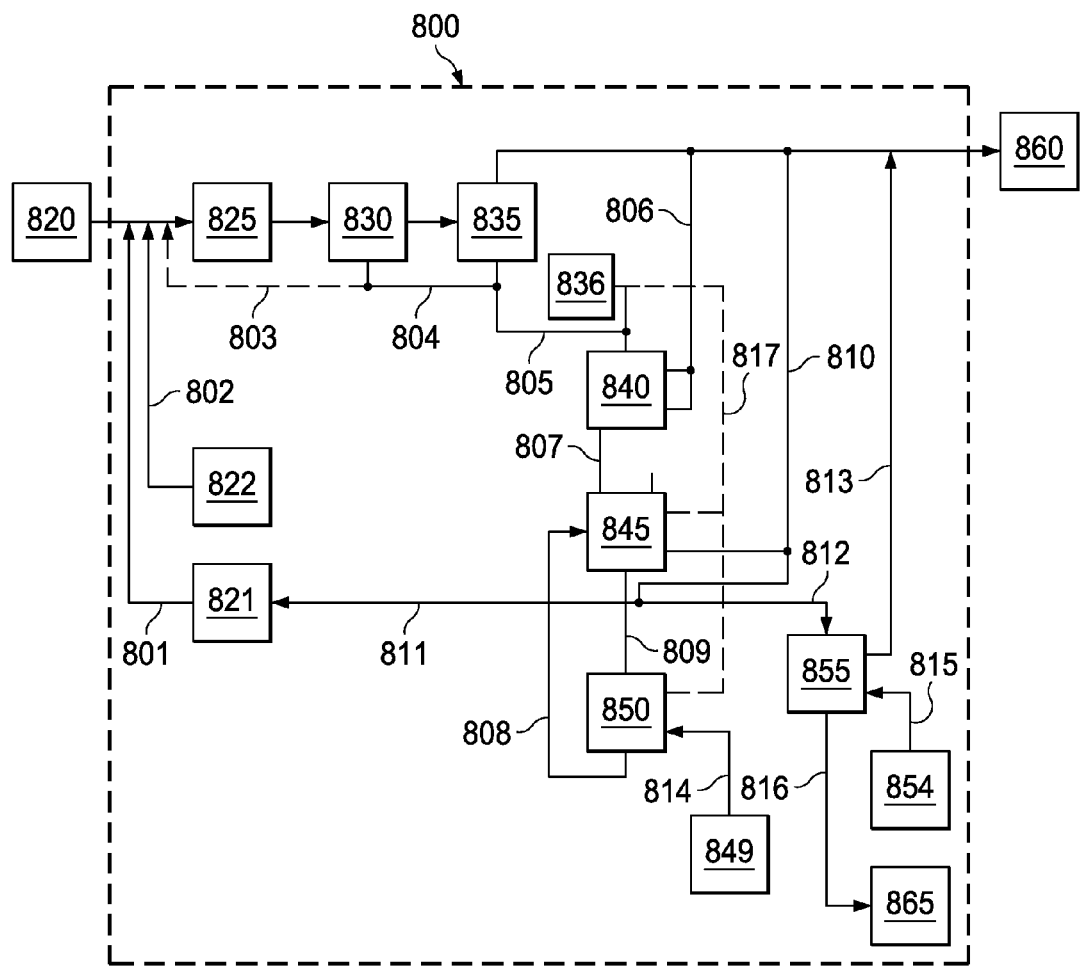
FIG. 15 illustrates an example embodiment of a block diagram demonstrating an example embodiment of a decontamination system.

FIG. 15 is a schematic diagram illustrating an example embodiment of a decontamination system 800 according to the present disclosure. System 800 receives a feed stream 820, which provides incoming contaminated fluid in need of filtration. In an embodiment, feed stream 820 may include a variety of contaminants, including various organic and inorganic compounds, such as metals, dissolved solids, and color compounds. An example list of metal contaminates includes phosphorus, lead, iron, manganese, technetium, arsenic, silver, gold, platinum, mercury, and chromium. Feed stream 820 may be mixed with suitable adsorbents provided from a reservoir 821 via a stream 801, resulting in a slurry stream 130. It is to be appreciated that suitable adsorbents may be any particle or mixture of particles that have good adsorptive capacity for the contaminants in feed stream 820 but may be stripped of the contaminants using a desorption process. Any insoluble particles described in the present disclosure may be a suitable adsorbent. For example, in an embodiment where chromium compounds are present in feed stream 820, titanium dioxide, $TiO_2$, may be a suitable adsorbent. In some embodiments, stream 801 may be metered (e.g., continuously metered) into feed stream 820 to generate a desired concentration of adsorbent (e.g., $TiO_2$) in stream 820. According to some embodiments, turbidity may be used as a surrogate measure of adsorbent concentration. Concentrations of $TiO_2$ may be about 350 mg/L and the turbidity of 350 mg/L may be measured and used as a set-point to determine how much $TiO_2$ to add. Turbidity (or another metric) may be assessed once or at any desired interval including continuously, periodically, haphazardly, and/or randomly.

In some embodiments, acid stream 802 (e.g., citric acid) may be dosed into stream 820 from tank 822. Citric acid plugs the photogenerated hole of the activated TiO2, providing conduction band electrons for enhanced photocatalytic reduction rates as described, for example, in U.S. Pat. No. 5,554,300. Testing has demonstrated substantial power reductions with the use of citric acid. For example, order of magnitude increases in hexavalent chromium first order reduction rates have been observed.

Also shown in FIG. 15 is photocatalyst reactor 825 that receives slurry stream 130 and reduces contaminants. For example, hexavalent chromium ($Cr^6$) may be reduced to trivalent chromium ($Cr^3$) in reactor 825. Conditions in reactor 825 may be configured to permit and/or promote adsorption of a reduced contaminant onto an adsorbent. For example, trivalent chromium ($Cr^3$) may adsorb onto the surface of $TiO_2$. Testing has demonstrated reactor 825 may reduce 450 ppb of hexavalent chromium ($Cr^6$) to below 1 ppb with just ~1.5 $kWh/m^3$ of treatment.

In some embodiments, photocatalytic reactor 825 and catalyst recovery unit 835 may operate like a photocatalytic system used for organic destruction. After the photocatalytic reaction, the $Cr^3$—$TiO_2$ slurry discharges from the photocatalytic racks and enters an atmospheric accumulator tank 830. A ceramic membrane (catalyst recovery unit or CRU) may operate in a standard cross flow manner to remove the $Cr^3$—$TiO_2$ slurry (804), and the treated water 860 (e.g., <1 ppb $Cr^6$) may be discharged. The CRU may concentrate the $TiO_2$ 10-20 times in the CRU loop.

A slip stream of the contaminant/adsorbent concentrate in CRU loop may be discharged (e.g., continuously discharged) to a contaminant removal and recovery process. For example, a slip stream of $TiO_2$ concentrate in loop 805 may be discharged to a $Cr^3$ removal and recovery process. This step may not be included in a photocatalytic process for organic destruction.

According to some embodiments, the flow rate of slurry 805 to the $Cr^3$ removal process may be minimized, for system optimization. Similarly, some of the $TiO_2$ slurry from the CRU loop 803 may be recycled back to the inlet of photocatalytic reactor 825. This may reduce the mass of clean adsorbent (e.g., $TiO_2$) required from reservoir 821. The amount of the $TiO_2$ slurry to be recycled back to reactor 825 and the amount of slurry 805 may be configured (e.g., optimized), according to some embodiments, to reduce the mass (e.g., kg/hr) of $TiO_2$ sent to the $Cr^3$ removal process while still maintaining discharge water 860 at or below a specified threshold (e.g., <1 ppb $Cr^6$).

Figure 16:
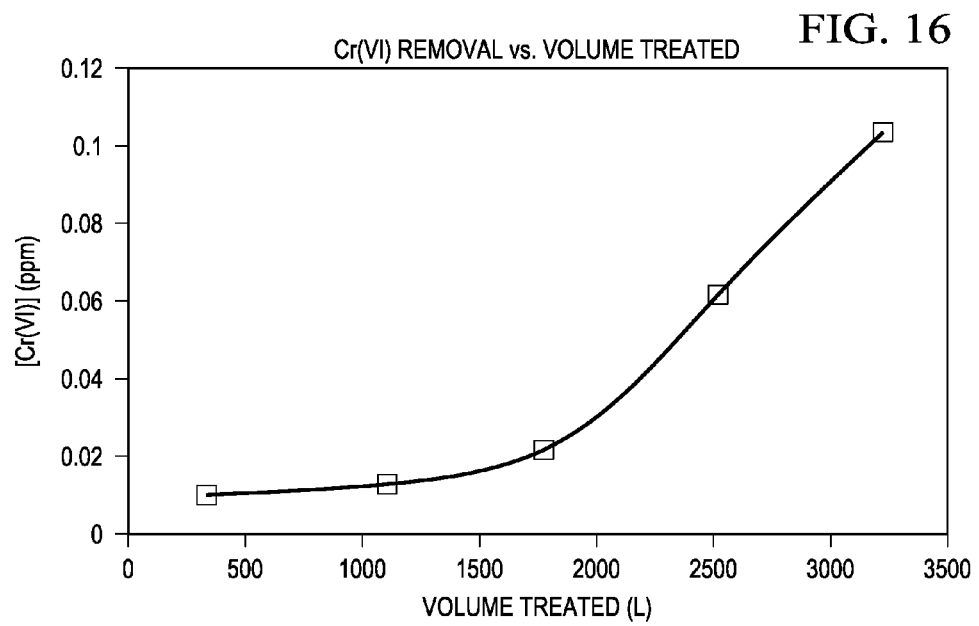
FIG. 16 shows the results of a pilot test of a decontamination systems operated in a batch mode.

Under some circumstances, the efficiency of the photocatalytic reduction of the $Cr^6$ to $Cr^3$ may decrease as the amount of $Cr^3$ adsorbing onto the $TiO_2$ increases due to reduction of available $TiO_2$ surface area. For example, batching a fixed mass of $TiO_2$ in a standard photocatalytic system may result in a continual loss of efficiency (e.g., where efficiency decreases as the surface of $TiO_2$ decreases), until the rate of chromium reduction in the photocatalytic reactor decreases to a point at which the $Cr^6$ in the effluent water would increase over the desired threshold (e.g., 1 ppb $Cr^6$). At this point, all of the $TiO_2$ in the system would need to be removed and replaced with cleaned $TiO_2$. This type of batch processing is difficult to operate and ensure that the $Cr^6$ discharge is maintaining its desired discharge specification at all times. FIG. 16 shows the results of a batch $TiO_2$ pilot test that illustrates this trend. Chromium was detected with a portable device with a detection limit of 0.03 ppm. Without limiting the disclosure to any particular mechanism of action, a fixed mass of $TiO_2$ in a Photo-Cat may decline in efficiency due to reduced surface area of the $TiO_2$. Since this may be regarded as undesirable, system 800 may be operated, in some embodiments, in a manner that avoids this efficiency decay. For example, the flow rates of slurry reflux 803 and of slurry 805 to $Cr^3$ removal process may be maintained constant, thus the process will achieve 'steady state operation.' Steady state operation may provide consistent removal of the $Cr^6$ (i.e., chromium mass in=chromium mass out) and constant $Cr^6$ concentration in effluent 860.

As shown in FIG. 15, slip stream 805 may be sent to dewatering module 840 to further concentrate the adsorbent and contaminant. For example, stream 805 may enter a dead-ended ceramic membrane oriented in a vertical position to concentrate the $TiO_2$ and $Cr^3$ slurry by another order of magnitude.

Figure 17:
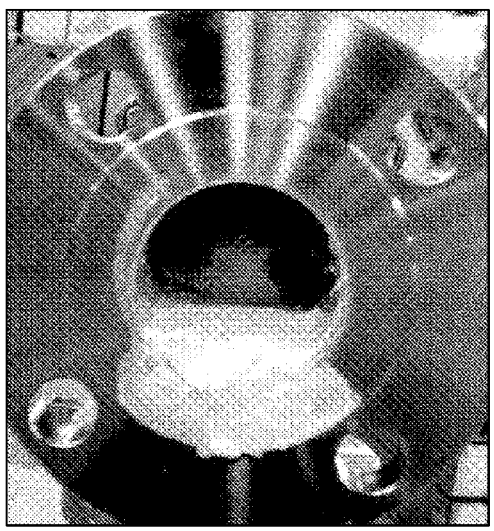
FIG. 17 illustrates an example embodiment of a trap in which contaminant-adsorbent material has collected after dead end filtration.

As the $TiO_2$—$Cr^3$ slurry gets pumped into the dead end membrane, the $TiO_2$—$Cr^3$ is filtered, and the filtered water is sent to discharge 806. Inside the membrane housing, the combination of gravity and air shock waves make the $TiO_2$—$Cr^3$ solids drop down into a collection weir located immediately below the membrane. This process concentrates the $TiO_2$—$Cr^3$, and it also keeps the $TiO_2$—$Cr^3$ from filling or plugging inside the ceramic membrane channels, keeping them free. The free channels may provide consistent flux in the membrane(s), unlike most dead-end filters which accumulate the solids inside the filter itself (and thus flux continuously reduces). FIG. 17 illustrates a weir in which the $TiO_2$ has dropped out after dead end filtration.

Once the weir is nearly full of $TiO_2$—$Cr^3$, a valve may be opened and the mixture 807 may pass into dewater/mixer tank 845, which may be configured to perform one or more functions. For example, dewater/mixer tank 845 may be configured to further dewater mixture 807. It may include dewatering membranes in some embodiments. Compressed air 817 from tank 836 may be used to push the $TiO_2$—$Cr^3$ slurry into the dewatering membranes. The pressure pushes the water through the membranes and the treated water is sent to the discharge 810, while the dewatered $TiO_2$—$Cr^3$ slurry is retained for further processing.

Dewater/mixer tank 845 may be configured, according to some embodiments, to add acid 808 from acid storage tank 850 to desorb contaminant (e.g., $Cr^3$) from adsorbent (e.g., $TiO_2$), according to some embodiments. For example, a volume of heated (e.g., ~40 to ~60° C.) sulfuric acid (e.g., ~1 wt. %-~5 wt. %), may be added to dewater/mixer tank 845 where it may mix with dewatered $Cr^3$—$TiO_2$. In some embodiments, it may be desirable to avoid using a pump to move heated acid into dewater/mixer tank 845. Instead, it may be desirable to use compressed air 817 to push acid 808 into dewater/mixer tank 845. Once the acid is added, compressed air 817 is sent up through the bottom of dewater/mixer tank 845. The internal design of dewater/mixer tank 845 may be arranged to create small bubbles of air which flow up through the acid $TiO_2$—$Cr^3$ mixture, providing significant mixing required to strip off the $Cr^3$ from the $TiO_2$. The heated acid and agitation transfers the $Cr^3$ from the $TiO_2$ into the acid mixture. Tests show that this process may take about 20 to about 30 minutes. In some embodiments, it may be desirable to maintain the contents of acid storage tank 850 at constant free acid concentration (i.e., pH). In such cases, make-up acid 814 from make-up tank 849 may be added to tank 850.

Fluid mixture 809 may pass from dewater/mixer tank 845 into acid storage tank 850. Fluid mixture 809 may comprise or consist of acid (e.g., sulfuric acid) and contaminant (e.g., dissolved trivalent chromium). Compressed air 817 from tank 836 may be used to push fluid mixture 809 into acid storage tank 850.

The remaining $TiO_2$ in dewater/mixer tank 845 may be expected to have some acid with dissolved $Cr^3$ in it. In some embodiments, the acid and dissolved $Cr^3$ must be flushed out of the $TiO_2$ before the $TiO_2$ can be sent to reservoir 821. In these embodiments, the concentration of $Cr^3$ entrained in the $TiO_2$ mixture will be too high if this flush is not performed. Eventually the mass of contaminant (e.g., $Cr^3$) going back to reservoir 821 (and eventually back to photocatalytic reactor 825) will cause the total contaminant (e.g., chromium) concentration to exceed the desired threshold concentration (e.g., <20 ppb chromium). (During pilot experiments, dissolved $Cr^3$ in the feed water was not observed to adsorb onto the $TiO_2$. Instead, it only seemed to adsorb after $Cr^6$ reduction). A volume of treated water 810 is sent into dewater/ mixer tank 845 and it is then pushed through the membrane (e.g., like stream 807 above) and placed in rinse water tank 855 via stream 812. Stream 812 may have a low pH (e.g., ~0.5 to ~3.0) and comprise dissolved $Cr^3$.

Figure 18:
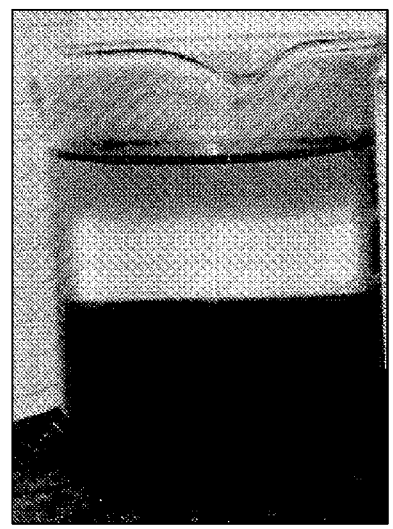
FIG. 18 illustrates an example embodiment of low pH contaminant water after neutralization with base to a pH greater than neutral, including contaminant precipitate.

Base 815 (e.g., NaOH) is then added to the rinse water tank 855 (from tank 854) to neutralize the water and precipitate the $Cr^3$ into $Cr(OH)_3$. FIG. 18 illustrates the low pH $Cr^3$ water after neutralization with NaOH to a pH of 8.5 (showing the $Cr(OH)_3$ precipitate). Testing showed that the total chromium can be precipitated from 26.8 ppm down to 0.032 ppm. Thus, the small volume of supernatant from rinse water tank 855 can be metered into discharge 813 without exceeding the desired threshold (e.g., <20 ppb total chromium).

Precipitate 865 may be recovered by, for example, (a) gravity thickening and/or using ceramic membrane filtration and/or (b) using the dewatering approach used above. Chromium solid 816 is the recovered chromium, which can either be hauled away, or re-used in some other manufacturing process. If it is re-used, this remediation process could also be called a 'mining' process. In some embodiments, a decontamination process may have zero contaminated liquid discharge.

Once the $TiO_2$ has been flushed and dewatered, it is deemed 'clean', and treated water 810 is sent back to dewater/mixer tank 845 where the $TiO_2$ is slurried (required to transport it) and then sent back to the Clean $TiO_2$ Storage Tank for reuse via stream 811 using compressed air 817.

As will be understood by those skilled in the art who have the benefit of the instant disclosure, other equivalent or alternative compositions, devices, methods, and systems for reduction and/or removal of one or more heavy metals (e.g., heavy metals, chromium, phosphorous, phosphorous compounds, nitrogen, nitrogen compounds) from a feed composition (e.g., a fluid) can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of inlets, valves, fluid connections, tanks, reactors, and discharges may be varied. In some embodiments, inlets, valves, fluid connections, tanks, reactors, and discharges may be interchangeable with like or different structures. Interchangeability may allow volume, flow rate, processing time, and yield to be custom adjusted. In addition, the size of a device and/or system may be scaled up (e.g., to be used for industrial embodiments) or down (e.g., to be used for portable embodiments) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/−about 10%, depicted value +/−about 50%, depicted value +/−about 100%) and/or a range endpoint. With respect to the former, a value of 50 depicted in an example, table, and/or drawing may form the basis of a range of, for example, about 45 to about 55, about 25 to about 100, and/or about 0 to about 100.

All or a portion of a device and/or system for reduction and/or removal of one or more heavy metals (e.g., heavy metals, chromium, phosphorous, phosphorous compounds, nitrogen, nitrogen compounds) from a feed composition (e.g., a fluid) may be configured and arranged to be disposable, serviceable, interchangeable, and/or replaceable. These equivalents and alternatives along with obvious changes and modifications are intended to be included within the scope of the present disclosure. Accordingly, the foregoing embodiments are intended to be illustrative, but not limiting, of the scope of the disclosure as illustrated by the appended claims.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A decontamination system for removing a contaminant from an intake fluid comprising the contaminant, the system comprising:
   (a) a fluid reactor configured
      (i) to receive the intake fluid,
      (ii) to permit the contaminant to bind an adsorbent to form a contaminant-adsorbent material, and
      (iii) to form a fluid reactor output stream comprising the contaminant-adsorbent material;
   (b) a catalyst recovery unit (CRU)
      (i) comprising a CRU porous membrane defining a CRU retentate portion and a CRU permeate portion of the catalyst recovery unit,
      (ii) configured to receive the fluid reactor output stream in the CRU retentate portion of the CRU porous membrane and fractionate the fluid reactor output stream into
         a CRU retentate comprising the contaminant-adsorbent material in the CRU retentate portion of the catalyst recovery unit and
         a CRU permeate substantially free of the contaminant in the CRU permeate portion of the catalyst recovery unit, wherein the CRU retentate portion is in fluid communication with an intake stream and a CRU filtrate forms a first discharge stream;
(c) a contaminant-concentrating module (DeWRS)
  (i) in fluid communication with the CRU retentate portion of the catalyst recovery unit,
  (ii) comprising a DeWRS porous membrane, oriented in a vertical position, defining a DeWRS retentate portion and a DeWRS permeate portion of the contaminant- concentrating module,
  (iii) configured to receive at least a portion of the CRU retentate in the DeWRS retentate portion of the contaminant-concentrating module and fractionate the CRU retentate into
    a DeWRS retentate comprising the contaminant-adsorbent material in the DeWRS retentate portion of the contaminant-concentrating module and
    a DeWRS permeate substantially free of the contaminant in the DeWRS permeate portion of the contaminant-concentrating module, wherein a DeWRS filtrate forms a second discharge stream, and
  (iv) configured to permit the contaminant-adsorbent material in the DeWRS retentate to
    settle into a contaminant trap positioned below the DeWRS porous membrane, and
    form a contaminant trap slug;
(d) a contaminant-adsorbent desorption unit, wherein the contaminant-adsorbent desorption unit:
  (i) is in fluid communication with the DeWRS retentate portion of the contaminant-concentrating module and in fluid communication with a first storage tank so as to receive an acidic composition or a basic composition of the first storage tank,
  (ii) comprises a heating unit, a desorbed adsorbent separation device comprising a contaminant-adsorbent desorption unit porous membrane defining a contaminant-adsorbent desorption unit retentate portion, the first storage tank configured to contain the acidic composition having a pH below about 7 or the basic composition having a pH above about 7, and a contaminant-adsorbent desorption unit permeate portion of the the contaminant-adsorbent desorption unit,
  (iii) is configured to
    receive at least a portion of the DeWRS retentate in the contaminant-adsorbent desorption unit retentate portion of the a contaminant-adsorbent desorption unit and fractionate the received DeWRS retentate into
      a contaminant-adsorbent desorption unit retentate comprising the contaminant-adsorbent material in the contaminant-adsorbent desorption unit retentate portion of the contaminant-adsorbent desorption unit and
      a contaminant-adsorbent desorption unit permeate substantially free of the contaminant in the contaminant-adsorbent desorption unit permeate portion of the contaminant-adsorbent desorption unit, wherein the contaminant-adsorbent desorption unit filtrate forms a third discharge stream;
    receive from the first storage tank into the contaminant-adsorbent desorption unit retentate portion of the contaminant-adsorbent desorption unit an amount of the acid composition,
    desorb the contaminant from the adsorbent by mixing the contents of the contaminant-adsorbent desorption unit retentate portion of the contaminant-adsorbent desorption unit to permit desorption of the contaminant from the adsorbent to form a desorbed contaminant stream, a desorbed adsorbent stream, and, optionally, a residual contaminant-adsorbent material, wherein the heating unit is configured to heat the contents of the contaminant-adsorbent desorption unit retentate portion of the contaminant-adsorbent desorption unit to promote desorption of the contaminant from the adsorbent, and
    convey the optional residual contaminant-adsorbent material, if present, to the first storage tank;
(e) a clean adsorbent storage tank in fluid communication with the desorbed adsorbent stream and the intake stream;
(f) a second storage tank configured to contain a second storage tank fluid comprising
  (i) a base if the first storage tank contains the acidic composition, or
  (ii) an acid if the first storage tank contains the basic composition;
(g) a rinse tank in fluid communication with the desorbed contaminant stream, in fluid communication with the second storage tank and configured to receive and mix the received desorbed contaminant stream with the received second storage tank fluid to permit formation of a contaminant precipitate and a rinse tank supernatant, wherein the rinse tank supernatant forms a fourth discharge stream.

2. A decontamination system according to claim 1, wherein the fluid reactor is configured to permit the change of oxidation state of at least a portion of the contaminant to form a reduced contaminant or an oxidized contaminant.

3. A decontamination system according to claim 1, wherein the fluid reactor comprises a photocatalytic reactor operable to photo reduce the contaminant.

4. A decontamination system according to claim 1, wherein the contaminant is chromium.

5. A decontamination system according to claim 1, wherein the contaminant is hexavalent chromium.

6. A decontamination system according to claim 2, wherein the reduced contaminant is trivalent chromium.

7. A decontamination system according to claim 1, wherein the adsorbent comprises titanium.

8. A decontamination system according to claim 1, wherein the adsorbent comprises titanium oxide.

9. A decontamination system according to claim 1, wherein the CRU porous membrane comprises a ceramic membrane.

10. A decontamination system according to claim 9, wherein the CRU porous membrane is configured to operate as a crossflow membrane.

11. A decontamination system according to claim 1, wherein the concentration of the contaminant-adsorbent material in the CRU retentate is from about 10 times to about 20 times higher than the concentration of the contaminant-adsorbent material in a reduction reactor output stream.

12. A decontamination system according to claim 1, wherein the DeWRS porous membrane comprises a ceramic membrane.

13. A decontamination system according to claim 12, wherein the DeWRS porous membrane is configured to operate as a dead-end membrane.

14. A decontamination system according to claim 1, wherein the concentration of the contaminant-adsorbent material in the contaminant trap slug is from about 10 times to about 20 times higher than the concentration of the contaminant-adsorbent material in the CRU retentate.

15. A decontamination system according to claim 1, wherein the contaminant-concentrating module is further configured to pulse the DeWRS porous membrane with a fluid shock.

16. A decontamination system according to claim 1, wherein the contaminant-adsorbent desorption unit is further configured to receive the at least a portion of the DeWRS retentate in the contaminant-adsorbent desorption unit retentate portion of the contaminant-adsorbent desorption unit under pressure.

17. A decontamination system according to claim 1, wherein the contaminant-adsorbent desorption unit is further configured to mix the contents of the contaminant-adsorbent desorption unit retentate portion of the contaminant-adsorbent desorption unit to form a contaminant-adsorbent desorption unit mixture by bubbling a gas through the contents of the contaminant-adsorbent desorption unit retentate portion of the contaminant-adsorbent desorption unit.

18. A decontamination system according to claim 1, wherein the contaminant-adsorbent desorption unit is further configured to receive the amount of the acid composition at a temperature of about 40 ° C. to about 60 ° C., at a concentration of up to about 5 wt. %, and at a pH of less than about 1.

19. A decontamination system according to claim 1, wherein the first storage tank is in fluid communication with a make-up tank configured to contain a volume of a make-up acid composition or a volume of a make-up base composition.

20. A decontamination system according to claim 1, wherein the first storage tank acid composition comprises sulfuric acid.

21. A decontamination system according to claim 1, wherein the contaminant comprises chromium.

22. A decontamination system according to claim 1, wherein the contaminant comprises phosphorous or a phosphorous compound.

23. A decontamination system according to claim 1, wherein the contaminant comprises nitrogen or a nitrogen compound.

24. A decontamination system according to claim 1, wherein the first discharge stream, the second discharge stream, the third discharge stream, and the fourth discharge stream each comprises less than about 20 ppb of the contaminant.

25. A decontamination system according to claim 1, wherein the first discharge stream, the second discharge stream, the third discharge stream, and the fourth discharge stream each comprises less than about 1 ppb of the contaminant.

26. A decontamination system according to claim 25, wherein the first discharge stream, the second discharge stream, the third discharge stream, and the fourth discharge stream together form a composite discharge stream.

27. A decontamination system according to claim 26, wherein the composite discharge stream comprises less than about 20 ppb of the contaminant.

28. A decontamination system according to claim 26, wherein the composite discharge stream comprises less than about 1 ppb contaminant.

29. A method for separating an intake fluid comprising a contaminant into
a contaminant solid fraction and
a discharge fluid fraction substantially free of the contaminant, the method comprising:
(a) reducing the contaminant in a reduction reactor to form a reduced contaminant or oxidizing the contaminant in an oxidizing reactor to form an oxidized contaminant;
(b) adsorbing the reduced contaminant or the oxidized contaminant to an adsorbent to form a contaminant-adsorbent material;
(c) forming a fluid reactor output stream comprising the contaminant-adsorbent material;
(d) optionally combining a portion of the fluid reactor output stream into the intake fluid;
(e) fractionating up to all of the fluid reactor output stream in a catalyst recovery unit (CRU) comprising a CRU porous membrane into
a CRU retentate comprising the contaminant-adsorbent material and
a CRU permeate substantially free of the contaminant, wherein the CRU permeate forms a first discharge stream;
(f) fractionating the CRU retentate in a contaminant-concentrating module (DeWRS) comprising a DeWRS porous membrane oriented in a vertical position, into
a DeWRS retentate comprising the contaminant-adsorbent material and
a DeWRS permeate substantially free of the contaminant, wherein the DeWRS permeate forms a second discharge stream;
(g) gathering the contaminant-adsorbent material in the DeWRS retentate into a contaminant slug;
(h) fractionating the contaminant slug in a contaminant-concentrating mixer tank (DeWMT) comprising a DeWMT porous membrane into
a DeWMT retentate comprising the contaminant-adsorbent material and
a DeWMT permeate substantially free of the contaminant, wherein the DeWMT permeate forms a third discharge stream;
(i) adding acid from an acid storage tank to the DeWMT retentate comprising the contaminant-adsorbent material to form an acidified DeWMT retentate or adding acid or base from a storage tank to the DeWMT retentate comprising the contaminant-adsorbent material to form an acidified or basic DeWMT retentate;
(j) mixing the acidified or basic DeWMT retentate to desorb the contaminant from the adsorbent and form a desorbed contaminant stream, a desorbed adsorbent stream, and, optionally, a residual contaminant-adsorbent material;
(k) optionally combining up to an entirety of the desorbed absorbent stream into the intake fluid;
(l) combining in a rinse tank the desorbed contaminant stream with sufficient base to form a contaminant precipitate and a rinse water tank supernatant, wherein the rinse water tank supernatant forms a fourth discharge stream; and
(m) optionally conveying the residual contaminant-adsorbent material to the acid storage tank or the storage tank,
wherein the contaminant precipitate forms the contaminant solid fraction and the first, second, third, and fourth discharge streams together form the discharge fluid fraction.

30. A method for separating an intake fluid according to claim 29, wherein reducing the contaminant in the reduction reactor to form the reduced contaminant further comprises photo reducing the contaminant.

31. A method for separating an intake fluid according to claim 29, wherein the contaminant is chromium.

32. A method for separating an intake fluid according to claim 29, wherein the contaminant is hexavalent chromium.

33. A method for separating an intake fluid according to claim 29, wherein the reduced contaminant is trivalent chromium.

34. A method for separating an intake fluid according to claim 29, wherein the contaminant comprises phosphorous or a phosphorous compound.

35. A method for separating an intake fluid according to claim 29, wherein the contaminant comprises nitrogen or a nitrogen compound.

36. A method for separating an intake fluid according to claim 29, wherein the adsorbent comprises titanium.

37. A method for separating an intake fluid according to claim 29, wherein the adsorbent comprises titanium oxide.

38. A method for separating an intake fluid according to claim 29, wherein the CRU porous membrane comprises a ceramic membrane.

39. A method for separating an intake fluid according to claim 29 further comprising operating the CRU porous membrane as a crossflow membrane.

40. A method for separating an intake fluid according to claim 29, wherein the concentration of the contaminant-adsorbent material in the CRU retentate is from about 10 times to about 20 times higher than the concentration of the contaminant-adsorbent material in the fluid reactor output stream.

41. A method for separating an intake fluid according to claim 29, wherein the DeWRS porous membrane comprises a ceramic membrane.

42. A method for separating an intake fluid according to claim 29 further comprising operating the DeWRS membrane as a dead-end membrane.

43. A method for separating an intake fluid according to claim 29, wherein the concentration of the contaminant-adsorbent material in the contaminant slug is from about 10 times to about 20 times higher than the concentration of the contaminant-adsorbent material in the CRU retentate.

44. A method for separating an intake fluid according to claim 29 further comprises pulsing the DeWRS porous membrane with a dynamic shock.

45. A method for separating an intake fluid according to claim 29 further comprising conveying the DeWRS retentate to the contaminant-concentrating mixer tank under pressure.

46. A method for separating an intake fluid according to claim 29, wherein the mixing the acidified or basic DeWMT retentate further comprises bubbling a gas through contents of the contaminant-concentrating mixer tank.

47. A method for separating an intake fluid according to claim 29, wherein the acid added to the DeWMT retentate is pre-heated to a temperature of about 40° C. to about 60° C. and has a concentration of up to about 5 wt. % and a pH of less than about 1.

48. A method for separating an intake fluid according to claim 29 further comprising conveying make-up acid from a make-up acid storage tank to the acid storage tank.

49. A method for separating an intake fluid according to claim 29, wherein the acid comprises sulfuric acid.

50. A method for separating an intake fluid according to claim 29, wherein the contaminant comprises chromium.

51. A method for separating an intake fluid according to claim 29, wherein the first discharge stream, the second discharge stream, the third discharge stream, and the fourth discharge stream each comprises less than about 20 ppb of the contaminant.

52. A method for separating an intake fluid according to claim 29, wherein the first discharge stream, the second discharge stream, the third discharge stream, and the fourth discharge stream each comprises less than about 1 ppb of the reduced contaminant.

53. A method for separating an intake fluid according to claim 29, wherein the discharge fluid fraction comprises less than about 20 ppb of the contaminant.

54. A method for separating an intake fluid according to claim 29, wherein the discharge fluid fraction comprises less than about 1 ppb of the reduced contaminant.

55. A method for separating an intake fluid according to claim 29, wherein the base comprises sodium hydroxide.

56. A method for separating an intake fluid according to claim 29 further comprising maintaining constant the portion of the fluid reactor output stream combined into the intake fluid and a portion of the fluid reactor output stream fractionated in the catalyst recovery unit.

* * * * *